United States Patent [19]
Fujii et al.

[11] Patent Number: 6,004,498
[45] Date of Patent: Dec. 21, 1999

[54] METHOD FOR MOLDING RESIN TO SKIN MEMBERS

[75] Inventors: Tetsuya Fujii; Toshihiko Mori, both of Aichi; Kenichi Furuta, Gifu; Atsuo Kikuchi, Aichi; Yasuo Mouri, Mie; Tadamasa Kidera; Tetsuaki Inaba, both of Aichi; Akihiko Suzuki, Gifu; Akiyoshi Nagano; Tatsuo Yamada, both of Aichi; Katsuhiro Katagiri, Gifu, all of Japan

[73] Assignee: Toyoda Gosei Co. Ltd., Aichi-ken, Japan

[21] Appl. No.: 08/966,566

[22] Filed: Nov. 10, 1997

Related U.S. Application Data

[63] Continuation of application No. 08/417,153, Apr. 4, 1995, abandoned.

[30] Foreign Application Priority Data

| Apr. 4, 1994 | [JP] | Japan | 6-066314 |
| Apr. 5, 1994 | [JP] | Japan | 6-067459 |
| Apr. 28, 1994 | [JP] | Japan | 6-092517 |
| Oct. 24, 1994 | [JP] | Japan | 6-284277 |
| Oct. 24, 1994 | [JP] | Japan | 6-284278 |

[51] Int. Cl.$^6$ ............... B28B 7/22; B28B 1/24; B29C 53/00; B29B 7/00
[52] U.S. Cl. ............ 264/255; 264/259; 264/263; 264/266; 264/328.8; 264/328.12; 264/260
[58] Field of Search ............... 264/255, 266, 264/259, 328.8, 328.12, 339, 249, 260, 263

[56] References Cited

U.S. PATENT DOCUMENTS

| 3,063,097 | 11/1962 | Jutzi | 18/36 |
| 3,169,899 | 2/1965 | Steuber . | |
| 3,247,550 | 4/1966 | Haines, Jr. . | |
| 3,341,647 | 9/1967 | Aberle | 264/325 |
| 3,403,862 | 10/1968 | Dworjanganyn . | |
| 3,485,706 | 12/1969 | Evans . | |
| 3,532,589 | 10/1970 | David . | |
| 3,668,034 | 6/1972 | Nicholas et al. | 156/245 |
| 3,754,846 | 8/1973 | Choate | 425/125 |
| 3,950,119 | 4/1976 | Reichenbach | 425/251 |
| 4,006,210 | 2/1977 | Denton | 264/250 |
| 4,038,359 | 7/1977 | Pendleton | 264/263 |
| 4,152,389 | 5/1979 | Miller . | |
| 4,171,561 | 10/1979 | Bainard et al. | 29/527.1 |
| 4,219,322 | 8/1980 | Chang et al. | 425/576 |
| 4,239,243 | 12/1980 | Bainard et al. | 277/153 |
| 4,258,927 | 3/1981 | Cather, Jr. | 277/152 |

(List continued on next page.)

FOREIGN PATENT DOCUMENTS

| 0268954 | 6/1988 | European Pat. Off. . |
| 0288130 | 10/1988 | European Pat. Off. . |
| 0376263 | 7/1990 | European Pat. Off. . |
| 0475198 | 3/1992 | European Pat. Off. . |

(List continued on next page.)

OTHER PUBLICATIONS

Plastverarbeiter International, vol. 2, No. 2, Oct. 1, 1991, pp. 30–32, 34, XP 000263480, Jaeger A. et al., "The Economical and Flexible Alternative to Laminating" p. 32–page 34, figures 5,6.

"Tyvek Softening Process" Research Disclosure, No. 21126, p. 403 (Nov. 1981).

*Primary Examiner*—Jan H. Silbaugh
*Assistant Examiner*—Robin S. Gray
*Attorney, Agent, or Firm*—Pillsbury Madison & Sutro LLP Intellectual Property Group

[57] ABSTRACT

A resin part such as an instrument panel, a console box or door trim has a substrate body made of hard resin and a skin mounted on a surface of the substrate. To produce the resin part, a preformed elastic sheet is set within a mold cavity. Then, a molten resin is injected into the cavity through gates. The molten resin is first injected into the cavity through gates that are opposed to the skin and after the passage of a predetermined time, the resin is injected through gates that are not opposed to the skin, thereby forming a substrate that has the skin thermally fused to a surface thereof.

6 Claims, 23 Drawing Sheets

U.S. PATENT DOCUMENTS

| | | | |
|---|---|---|---|
| 4,321,225 | 3/1982 | Jelinek | 264/138 |
| 4,323,406 | 4/1982 | Morello | 156/91 |
| 4,331,316 | 5/1982 | Jandrasi | 251/86 |
| 4,406,847 | 9/1983 | O'Neal et al. | 264/138 |
| 4,420,452 | 12/1983 | Van Dalen et al. | 264/328.12 |
| 4,464,322 | 8/1984 | Butler | 264/138 |
| 4,555,376 | 11/1985 | Butler | 264/266 |
| 4,578,856 | 4/1986 | Butler | 29/451 |
| 4,723,350 | 2/1988 | Kobayashi et al. | 29/417 |
| 4,824,070 | 4/1989 | Mizuno et al. | 249/93 |
| 4,833,741 | 5/1989 | Mizuno et al. | 264/45.1 |
| 4,839,118 | 6/1989 | Labrie . | |
| 4,878,827 | 11/1989 | Muller . | |
| 4,956,136 | 9/1990 | Mizuno et al. | 264/46.6 |
| 4,957,680 | 9/1990 | Saxod et al. | 264/266 |
| 4,968,235 | 11/1990 | Nakane et al. | 425/4 R |
| 4,985,194 | 1/1991 | Watanabe | 264/247 |
| 4,994,226 | 2/1991 | Nakagawa et al. . | |
| 4,997,707 | 3/1991 | Otawa et al. . | |
| 5,007,815 | 4/1991 | Shoji | 425/117 |
| 5,023,130 | 6/1991 | Simpson et al. . | |
| 5,104,603 | 4/1992 | Saitoh | 264/266 |
| 5,132,071 | 7/1992 | Sorensen | 264/259 |
| 5,133,912 | 7/1992 | Hagiwara et al. . | |
| 5,281,383 | 1/1994 | Ueki et al. | 264/259 |
| 5,304,273 | 4/1994 | Kenrick et al. | 264/249 |
| 5,308,570 | 5/1994 | Hara et al. | 264/255 |
| 5,401,449 | 3/1995 | Hill et al. | 264/46.4 |
| 5,411,688 | 5/1995 | Morrison et al. | 264/45.4 |
| 5,429,786 | 7/1995 | Jogan et al. | 264/255 |
| 5,453,240 | 9/1995 | D'Hooren | 264/257 |
| 5,478,519 | 12/1995 | Carrara et al. | 264/328.7 |

FOREIGN PATENT DOCUMENTS

| | | | |
|---|---|---|---|
| 0482270 | 4/1992 | European Pat. Off. . | |
| 0491682 | 6/1992 | European Pat. Off. . | |
| 0615827 | 9/1994 | European Pat. Off. . | |
| 0628394 | 12/1994 | European Pat. Off. . | |
| 2262588 | 9/1975 | France . | |
| 57-208245 | 12/1982 | Japan . | |
| 62-19419 | 1/1987 | Japan . | |
| 02102010 | 4/1990 | Japan . | |
| 2121814 | 5/1990 | Japan | 264/260 |
| 404187414 | 7/1992 | Japan | 264/328.8 |
| 9404387 | 8/1992 | Japan . | |
| 405200768 | 8/1993 | Japan | 264/328.8 |
| 2 177 341 | 1/1987 | United Kingdom | 264/328.12 |
| 92/16349 | 10/1992 | WIPO . | |

| GATE NO. | #1 | #2 | #3 | #4 | #5 | #6 | #7 | #8 |
|---|---|---|---|---|---|---|---|---|
| GATE OPENED TIME | 0.0 | 0.0 | 0.0 | 0.0 | 0.0 | 0.2 | 4.5 | 0.7 |
| GATE CLOSED TIME | 5.0 | 4.31 | 4.41 | 4.8 | 5.6 | 13.02 | 13.0 | 13.0 |

RESIN INJECTED THROUGH GATES NO.#1 TO #5

6,004,498

METHOD FOR MOLDING RESIN TO SKIN MEMBERS

This is a continuation of applicaton Ser. No. 08/417,153, filed on Apr. 4, 1995, which was abandoned upon the filing hereof.

FIELD OF THE INVENTION

The present invention relates to a method for producing a resin part, such as an instrument panel, a console box, or door trim, for automobiles.

BACKGROUND OF THE INVENTION

Resin parts such as an instrumental panel, a console box or door trim are generally composed of a substrate made of a hard resin and a skin mounted on a surface of the substrate. Structurally, resin parts are classified into three major types: a "fully-padded type" having the skin mounted fully across a surface of the substrate; a "half-padded type" in which part of the substrate is exposed and part covered with skin; and a "padless type" which is solely composed of substrate.

Particularly, an instrument panel of the "half-padded type" is extensively used on low-price cars and is shown in FIGS. 12 (Prior Art) and 13 (Prior Art) indicated by reference numeral 51. The substrate 52 of the instrument panel 51 is required to have certain properties such as a specified rigidity and formability. To meet these requirements, the substrate is chiefly formed of ABS (acrylonitrile-butadiene-styrene), PP (polypropylene), etc. The elastic sheet (skin) 53 comprises a cushion layer 54 typically made of a soft polyurethane foam, an insert 55 (optional) buried under the cushion layer 54 and made of a resin or an iron plate, and a skin layer 56 made of PVC (polyvinyl chloride).

The instrument panel 51 may typically be fabricated by the following procedure. First, the substrate 52 is formed by a known injection molding technique. A surface of a separately vacuum-formed elastic sheet 53 is heated by means of a heater or the like. Then, the substrate 52 is set up in a vacuum forming mold, with a surface of the substrate having been coated with a primer, an adhesive and any other desired agents for pre-treatment. Thereafter, the preheated elastic sheet 53 is placed above and in alignment with the substrate 52 as shown in FIG. 14 and the two members are bonded together.

A problem with this approach is that the substrate 52 and the elastic sheet 53 have to be formed separately and subsequently bonded together. To accomplish this, it has been necessary to provide separate steps and molds for forming the substrate 52 and the elastic sheet 53. A further problem is that the need to apply the primer and adhesive adds to the number of overall steps involved. There has thus been a strong need to improve the efficiency of automotive instrument panel production while reducing the production cost.

SUMMARY OF THE INVENTION

The present invention has been made in view of the above problems with the prior art, and has as an object providing a method of producing a resin part comprising a substrate body and a skin mounted on a surface thereof, with higher efficiency, at lower cost.

In accordance with the above object, the present invention provides a method of molding a resin part having a substrate and a skin thermally fused to a surface of said substrate. The method comprising the steps of: forming the skin having an edge portion into a predetermined shape; providing a mold having an inner surface and defining a cavity therein; providing a plurality of gates for injecting molten resin into the cavity; setting the skin at a predetermined site within the cavity in contact with the inner surface; injecting a molten resin into the cavity through the plurality of gates until the cavity is filled with molten resin, thereby forming the substrate, thermally-fusing the skin to the substrate and forming the resin part; and taking the resin part out of the mold.

Preferably, the resin part comprises an exposed area in which the substrate is not covered with the skin, and the skin comprises an edge portion adjacent the exposed area.

In a further embodiment, the plurality of gates comprises: a first gate facing the site at which said skin is set; and a second gate facing a second portion of said mold for forming the exposed area. The step of injecting is carried out so that molten resin injected through said first gate flows past said edge of said skin before contacting molten resin injected through said second gate.

In a still further embodiment, the plurality of gates comprises: a first gate facing said site at which said skin is set; and a second gate facing a second portion of the mold. In this embodiment, the step of injecting is carried out so that molten resin injected through said first gate substantially reaches said second gate before molten resin is injected from said second gate to form said substrate.

The first aspect of the invention eliminates not only the step of applying an adhesive to a surface of the substrate body but also the step of bonding it to the skin. Additionally, there is no need to provide a special device such as a mold for bonding the two members.

In the second of the above embodiments of the invention, the first gate or gates are provided in positions that face the skin whereas the second gate or gates are provided in positions that face the non-skin area, so that the molten resin injected through the first gate or gates and the molten resin injected through the second gate or gates will contact each other in the exposed area of the substrate (e.g., the rear exterior of an edge of the skin). Hence, no defect occurs such as curling of the skin under which molten resin from the second gate or gates has flowed.

According to the third of the above embodiments of the invention, at least two gates are provided and at the time when the advancing end of the molten resin injected through one gate has substantially reached a second gate, another stream of the molten resin is injected through the second gate. The two flows of the molten resin are fused together and no weld line will form at the joint of the two melt flows even in the exposed area of the substrate which is not covered with the skin.

These and other features and advantages of the invention are described in or apparent from the following Detailed Description of the Preferred Embodiments, when considered together with the attached drawings.

BRIEF DESCRIPTION OF THE DRAWINGS

The invention will be disclosed in detail with reference to the following drawings wherein.

DETAILED DESCRIPTION OF PREFERRED EMBODIMENTS

The invention will now be described with respect to a number of preferred embodiments which are intended to be illustrative and not limiting.

Embodiment 1

Figure 1:
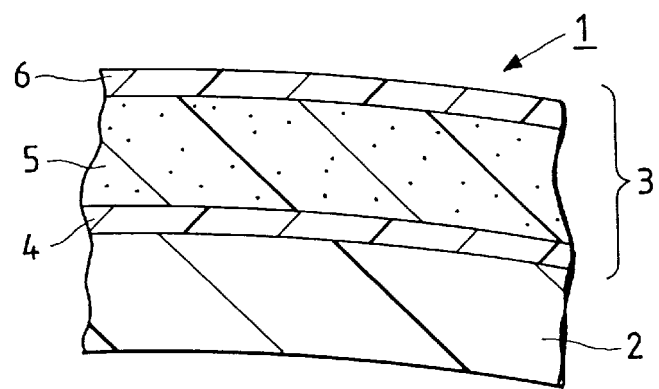
FIG. 1 is an enlarged section of an example of an automotive instrument panel made according to the present invention.
Figure 2:
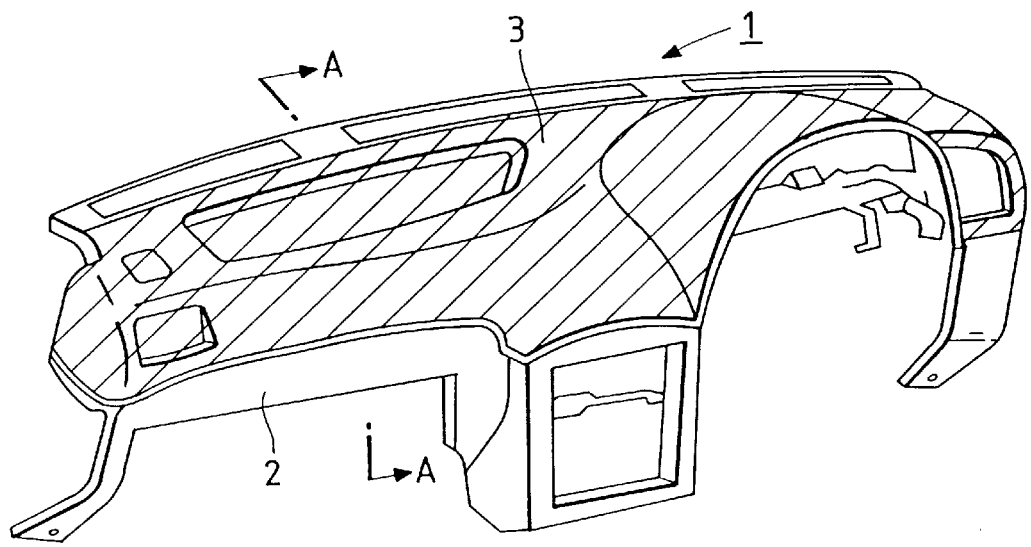
FIG. 2 is a perspective view of the instrument panel of FIG. 1.
Figure 3:
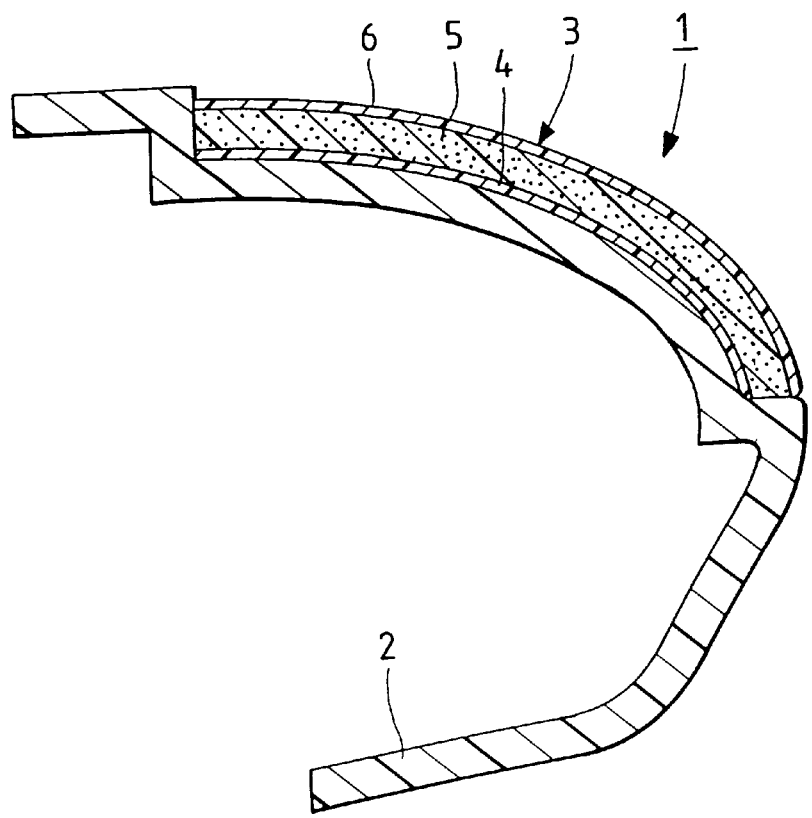
FIG. 3 is a section A—A of FIG. 2.

A first preferred embodiment of the present invention will now be described with reference to FIGS. 1 to 11. As shown in FIGS. 1 to 3, an instrument panel 1 is provided extending across an automobile below the windshield. The instrument panel 1 comprises a substrate body 2 and an elastic sheet 3 mounted in a selected area of the top surface of body 2 (the area of sheet 3 is hatched in FIG. 2). Thus, the instrument panel 1 of the embodiment under discussion is of the "half-padded type" which is commonly used in low-price cars, with part of the substrate body 2 being exposed and part covered with the elastic sheet 3.

Figure 4:
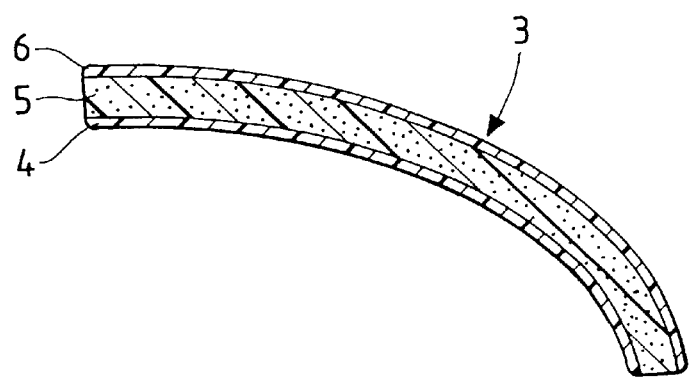
FIG. 4 is a section of the elastic sheet in the instrument panel shown in FIG. 2.

The substrate body 2 is made of a filler-loaded polypropylene (PP) to insure a specified rigidity. As shown in FIG. 4, the elastic sheet 3 comprises an innermost, heat-fusible PP Layer 4, a cushion Layer 5 located exterior to the heat-fusible, PP foam layer 4 (in the upper part of FIG. 4), and a solid skin layer 6, located exterior to the cushion layer 5 and made of polyvinyl chloride (PVC).

In the embodiment under discussion, the heat-fusible layer 4 in the elastic sheet 3 is thermally fused to the top surface of the substrate body 2, thereby insuring adhesion between the two members.

Figure 5:
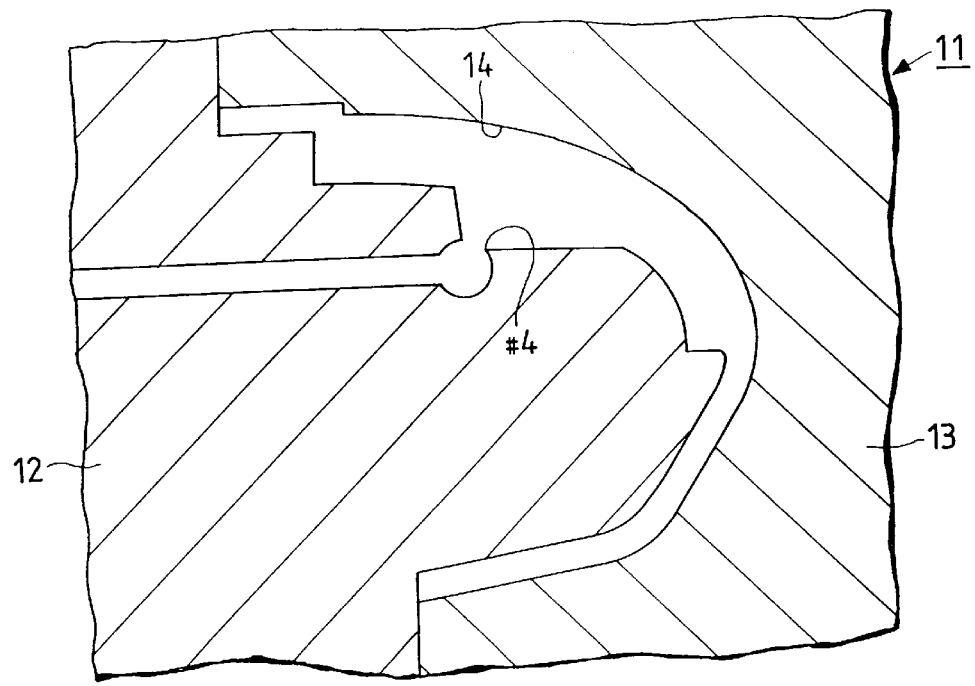
FIG. 5 is a section of a mold for use in producing the instrument panel shown in FIG. 2.

We now describe a mold used to form the substrate body 2 of the instrument panel 1. As shown in FIG. 5, the mold generally indicated by 11 comprises a fixed part 12, a moving part 13, and a cavity 14, defined by the two parts 12 and 13, for forming the substrate 2. The fixed part 12 has a plurality of gates (Nos. 1 to 8) that are open to the cavity 14 (only gate #4 is shown in FIG. 5). As shown clearly in FIG. 7, the gates (Nos. 1 to 8) are distributed in selected areas of the instrument panel 1. Five of these gates (Nos. 1 to 5) are opposed to the area where the elastic sheet 3 is to be placed, and the remaining three gates (Nos. 6 to 8) are opposed to areas where the elastic sheet 3 is not to be placed. Channels in the mold 11 that lead to the gates (Nos. 1 to 8) are fitted with control valves (not shown) for permitting or interrupting the passage of a resin to the respective gates. These control valves are adapted to open or close at predetermined times by means of a controller (not shown).

We now describe the process for producing the instrument panel 1 in the embodiment under consideration. The process starts with fabricating the elastic sheet 3 which, as shown in FIG. 3, is a flat sheet that has three layers, the heat-fusible layer 4, the cushion layer 5 and the solid skin layer 6. Subsequently, the sheet is shaped to conform to the shape of the top surface of the instrument panel 1 by a known vacuum forming technique. Thereafter, any excess sheet is trimmed off. This sequence of steps completes the fabrication of the elastic sheet 3.

Figure 6:
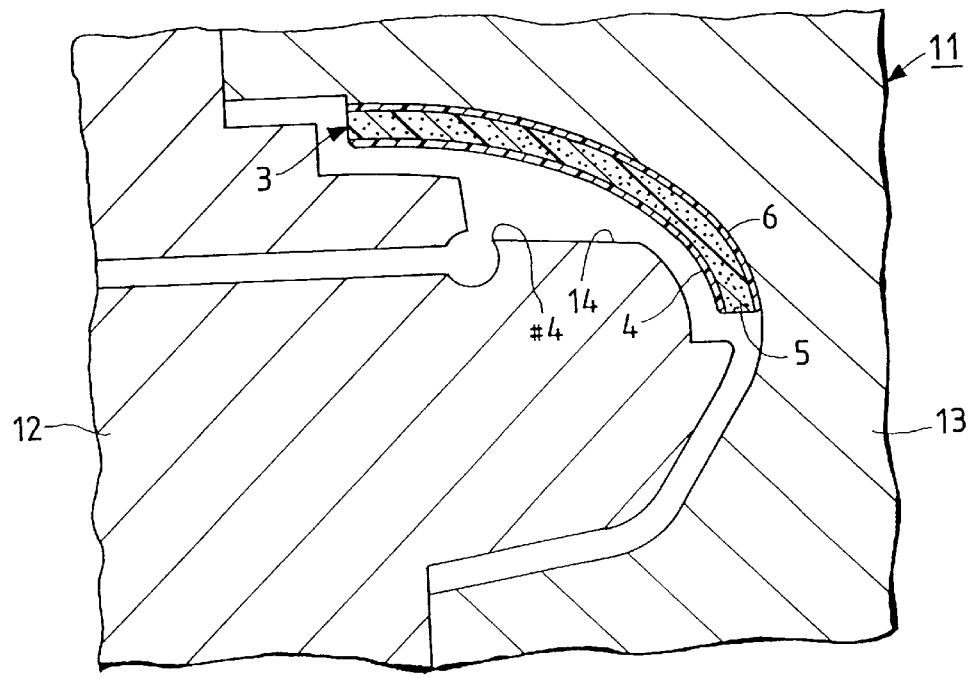
FIG. 6 is a section of the mold with the elastic sheet set at a predetermined site in a cavity.
Figure 7:
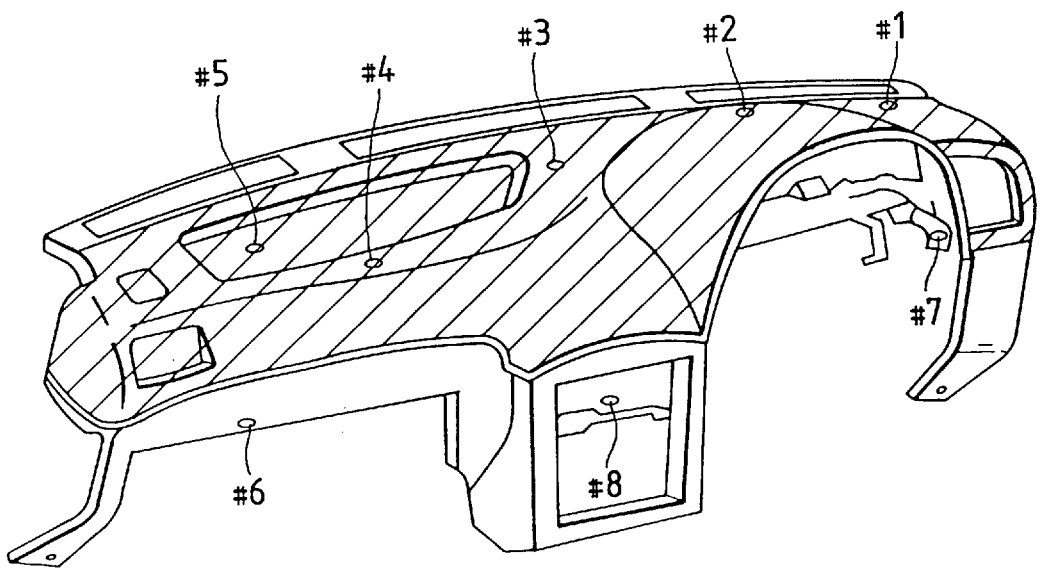
FIG. 7 shows diagrammatically the positions of gates that are open to the cavity in the mold for forming the substrate body of the instrument panel.

As shown in FIG. 6, the elastic sheet 3 is set at a predetermined site within cavity 14 (in its upper part) in the mold 11. The solid skin layer 6 in the elastic sheet 3 is in contact with an inner peripheral surface of the mold 11.

Figure 8:
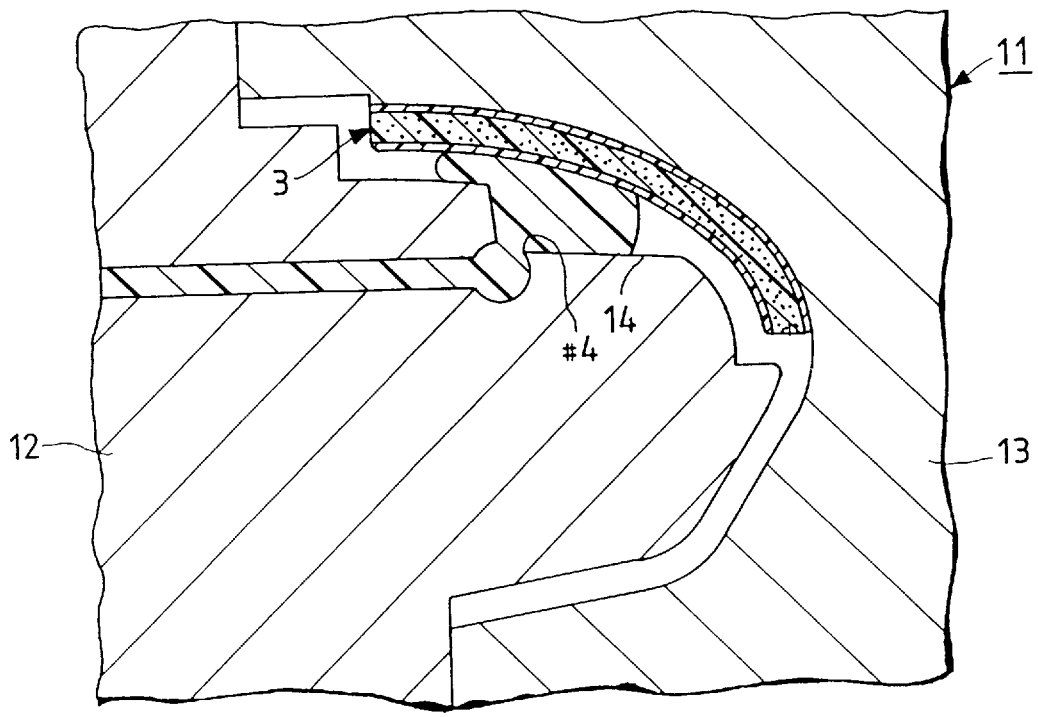
FIG. 8 is a section of the mold with a resin injected into the cavity.
Figures 9, 10:
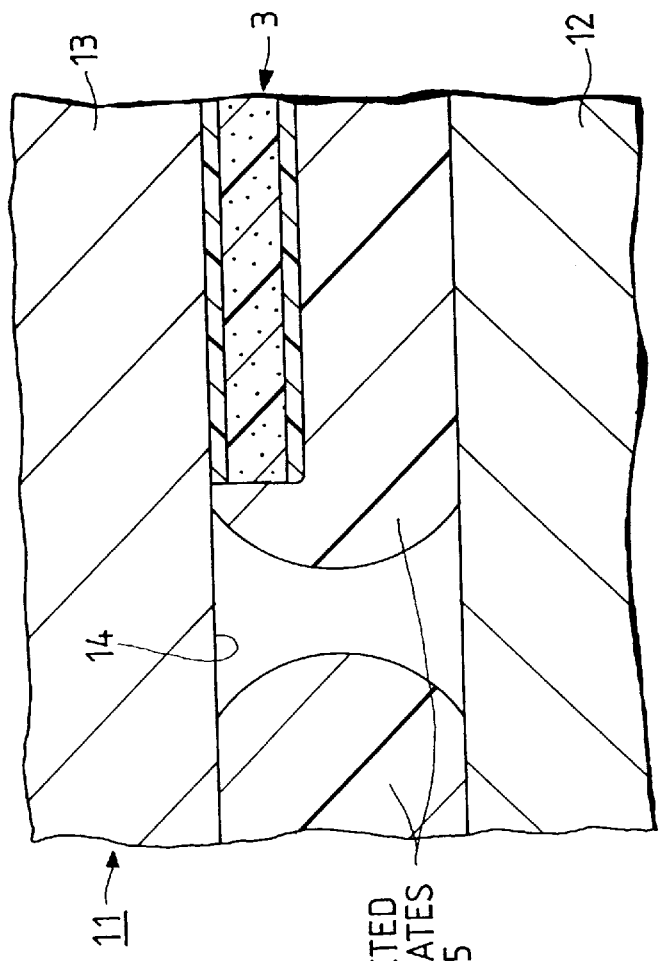
FIG. 9 is a timing chart for opening and closing the control values associated with the gates.
FIG. 10 is a partial section of the mold showing the effect of injecting a resin through two gate groups at different times in the production of the instrument panel.

Then, as FIG. 8 shows, a plasticized, filler-loaded PP is injected from an injection molding machine (not shown) into the cavity 14 through the gates (Nos. 1 to 8), with the associated control valves being turned on and off at predetermined times by means of the controller. Stated more specifically, the control valves associated with gate Nos. 1 to 5 which are opposed to the elastic sheet 3 are first opened as shown by the timing chart in FIG. 9 (the numerals in the chart refer to the times in seconds at which the respective gates are to be opened or closed, respectively). After a predetermined time, the control valves associated with gate Nos. 6 to 8 which are not opposed to the elastic sheet 3 are opened. As a result, the filler-loaded PP is injected into the cavity 14 through gate Nos. 1 to 5, and, after a predetermined time, the filler-loaded PP is injected through gates Nos. 6 to 8. As FIG. 10 shows, the filler-loaded PP (resin) that has been injected through one of gates Nos. 1 to 5 first flows outward along and past an edge of the elastic sheet 3 until it contacts the filler-loaded PP that has been injected through one of gates Nos. 6 to 8.

This process eliminates the possibility that elastic sheet 3 will be subject to stress at an edge due to the filler-loaded PP injected through one of gates Nos. 6 to 8 which are not opposed to said elastic sheet 3. In other words, the resin will not get into the space between the solid skin layer 6 of elastic sheet 3 and an inner surface of the mold 11. Thus, the elastic sheet 3 will not become curled up, and one source of defective parts can be eliminated.

Additionally, the delayed injection through certain gates (Nos. 6 to 8) allows the overall injection pressure and, hence, the cost of the mold 11, to be lowered.

Figure 11:
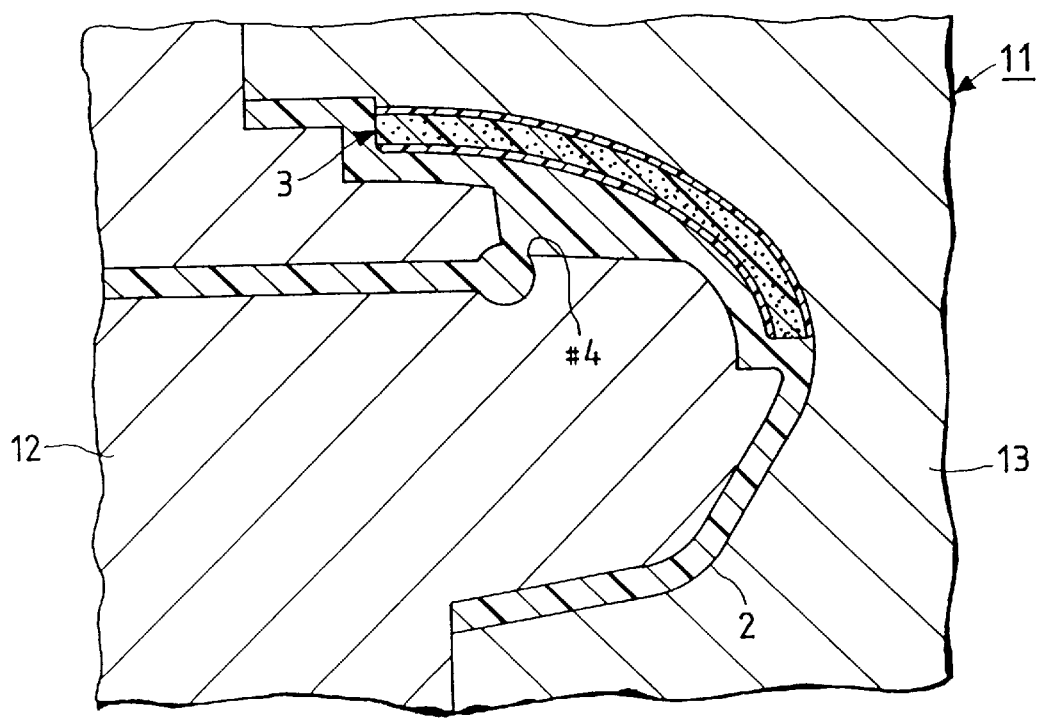
FIG. 11 is a section of the mold the cavity which as been completely filled with injected resin.
Figure 12:
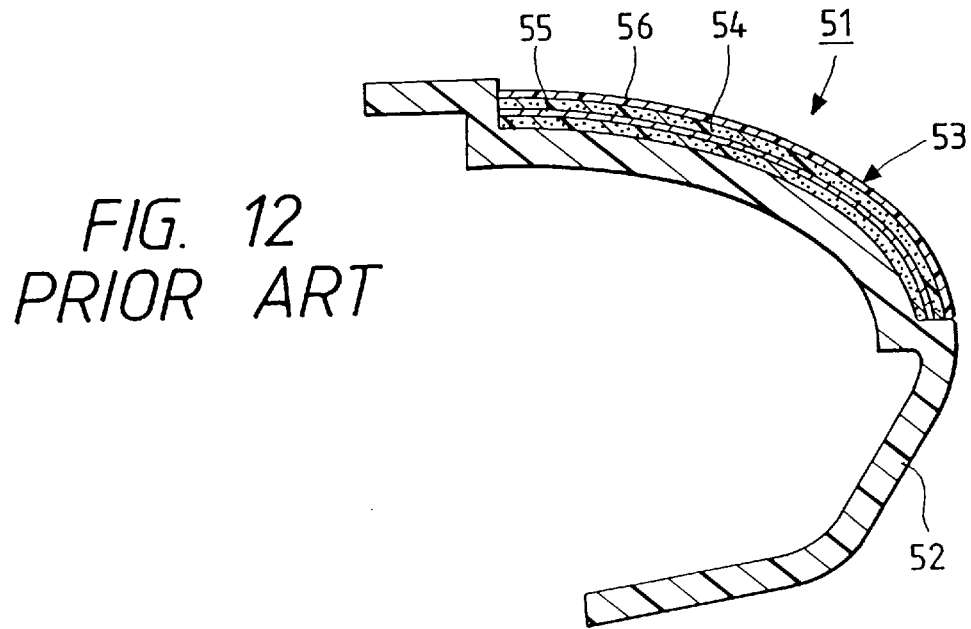
FIG. 12 is a section of a prior art automotive instrument panel.
Figure 13:
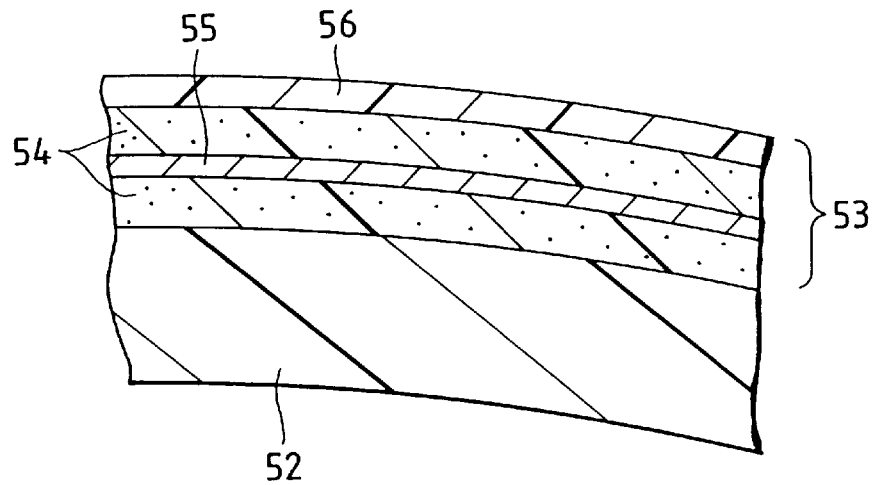
FIG. 13 is a partial section showing enlarged the prior art instrument panel.
Figure 14:
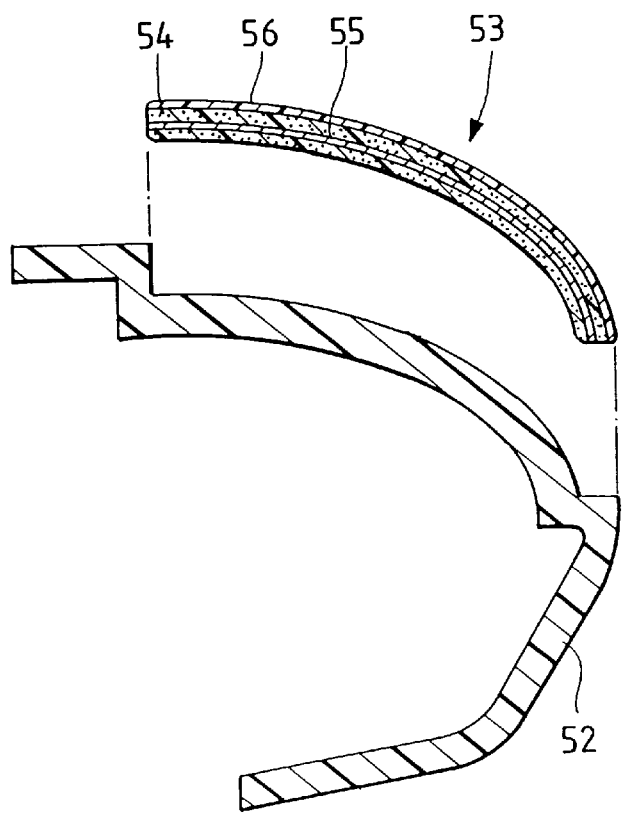
FIG. 14 is a section illustrating the process for producing the prior art instrument panel.

Subsequently, as FIG. 11 shows, the cavity 14 is filled with the filler-loaded PP, whereupon the heat-fusible layer 4 softens with the heat of the filler-loaded PP. As the filler-loaded PP cools to solidify, the heat-fusible layer 4 is fused to the filler-loaded PP, causing the elastic sheet 3 and the filler-loaded PP (substrate body 2) to be joined together (heat fused). Thereafter, the mold 11 is opened and the substrate body 2 with elastic sheet 3 mounted thereon is taken out of the mold to yield the complete instrument panel 1.

With the instrument panel 1 thus produced, its desired rigidity is assured by the substrate body 2 made of filler-loaded PP. The cushion layer 5 in the elastic sheet 3 mounted on part of the substrate-body 2 insures a soft feel to the touch whereas the solid skin layer 6 assures the anti-glare, weathering, heat-resisting properties, as well as the visual quality and other desirable properties. Additionally, the heat-fusible layer 4 assures the adhesion between the elastic sheet 3 and the substrate body 2.

In the embodiment under consideration, the adhesion between the substrate body 2 and the elastic sheet 3 is assured by the heat-fusible layer 4 which is located in the innermost part of the elastic sheet 3. To ensure the adhesion between the substrate body 2 and the elastic sheet 3, the latter is set up at a predetermined site in the mold 11 before forming the substrate body 2 in the manner described above. This eliminates not only the step of applying an adhesive to a surface of the substrate body 2, but also eliminates the step of bonding the substrate body 2 to the elastic sheet 3. Additionally, there is no need to provided a special device such as a mold for bonding the two members. These features combine to help improve the efficiency of production of automotive instrument panels while achieving marked reduction in the cost of their production.

It should be noted here that the invention is by no means limited to the embodiment described above and that part of its constitution may appropriately be modified as follows without departing from the spirit and scope of the invention.

In the embodiment, the substrate body 2 is formed of filler-loaded PP but it may be solely composed of PP. Other resins may be incorporated in the substrate body 2 as long as it comprises PP as a major component.

In the embodiment, the solid skin layer 6 is formed of PVC, but the solid skin layer 6 may also be formed of a thermoplastic polyolefin such as PP, or other suitable resin. If layer 6 is PP all parts of the automotive instrument panel 1 are formed of a polyolefinic resin, assuring even better adhesion between parts.

In the above first embodiment, gates (Nos. 1 to 8) are provided in eight areas within the mold 11 but it should be understood that the number and the layout of the gates are not limited in any particular way.

The solid skin layer 6 may be formed of a thermoplastic polyolefin. If this is the case, then all parts of the instrument panel are formed of a polyolefinic resin, thus assuring even better adhesion between parts.

As described in detail above, the first embodiment offers the advantage that an automotive instrument panel comprising a substrate body and an elastic sheet that is mounted on part of a surface thereof can be produced with higher efficiency at lower cost.

Further, there is provided an added advantage that the occurrence of defective parts due to the curling of the elastic sheet can effectively be prevented.

Embodiment 2

A second preferred embodiment of the present invention will now be described with reference to FIGS. 15 to 21.

Figure 15:
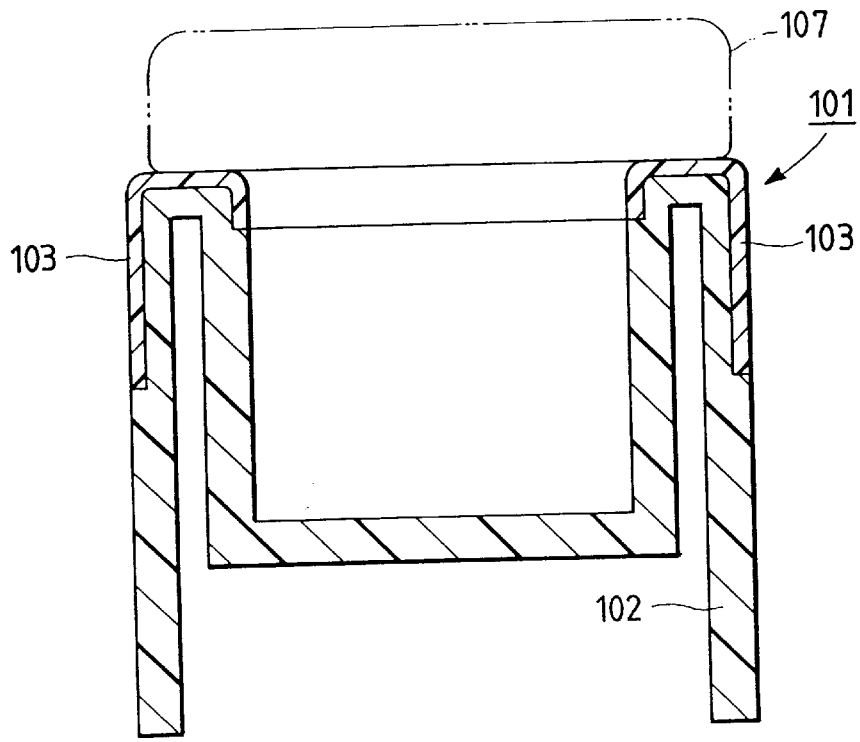
FIG. 15 is a section A—A of FIG. 16 and shows a console box according to the first example of the invention.
Figure 16:
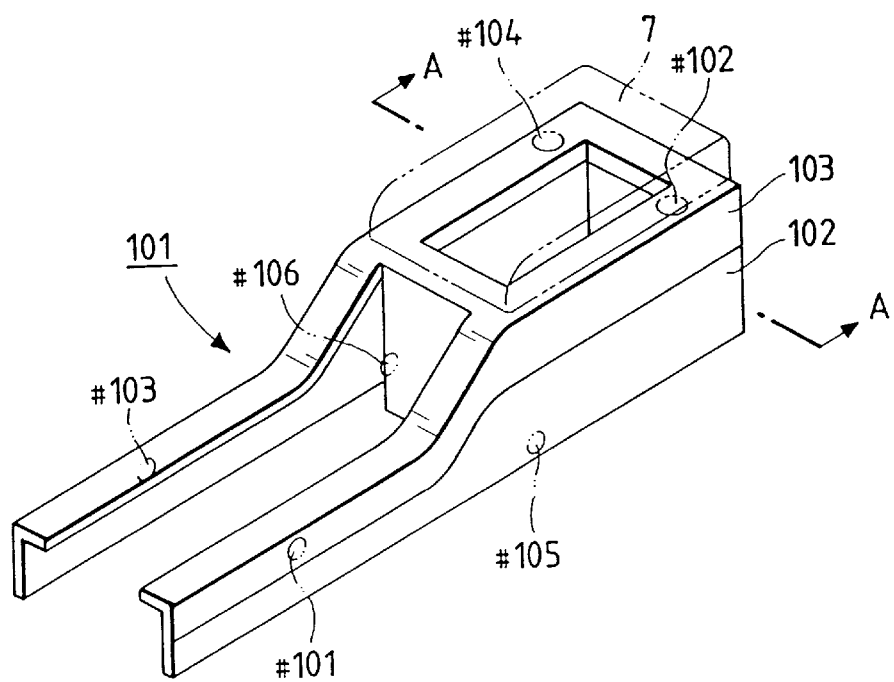
FIG. 16 is a perspective view of the console box, showing schematically the sites that correspond to the gates formed on a mold unit.

FIG. 16 is a perspective view showing the console box 101 of the second embodiment, and FIG. 15 is a section A—A of FIG. 16. As shown in these figures, the console box 101 comprises a substrate body 102 and an elastic sheet 103 mounted in the upper part of each lateral side of the substrate body 102 and in a selected area of its top surface. Thus, the console box 101 of the second embodiment does not have elastic sheet 103 mounted in the lower part of each side where an occupant's seat cushion (not shown) is to be located, and the substrate body 102 is exposed there.

Figure 17:
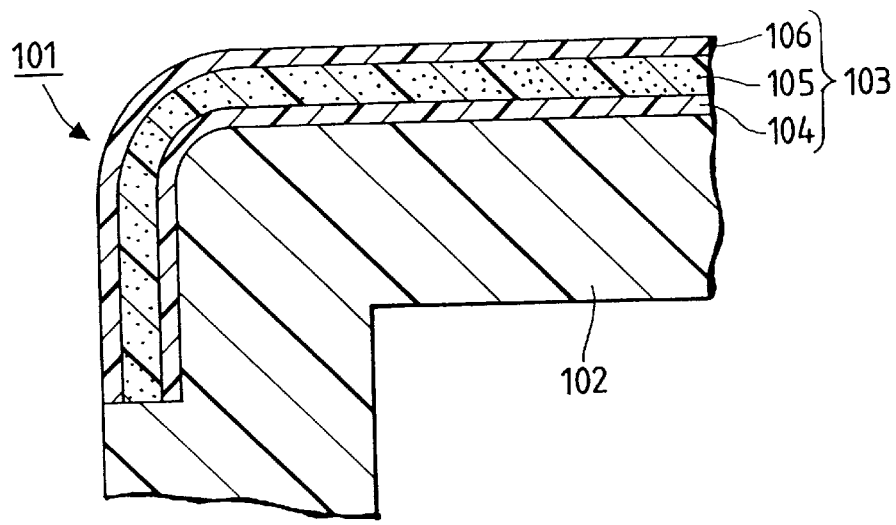
FIG. 17 is an enlarged section of the console box.

The substrate body 102 is made of a filler-loaded polypropylene (PP) to insure a specified rigidity. As shown in FIG. 17, the elastic sheet 103 comprises an inner, heat-fusible PP layer 104, a PP foam cushion layer 105 located exterior to the heat-fusible layer 104 (in the upper part of FIG. 17), and a polyvinylchloride (PVC) solid skin layer 106 located exterior to the cushion layer 105.

In the embodiment under discussion, the heat-fusible layer 104 in the elastic sheet 103 is thermally fused to he top surface of the substrate body 102, thereby insuring adhesion between the two members. During use, the console box 101 may be fitted with a top cover 107 indicated by the broken "dot-dot-dash" line in FIG. 15.

Figure 18:
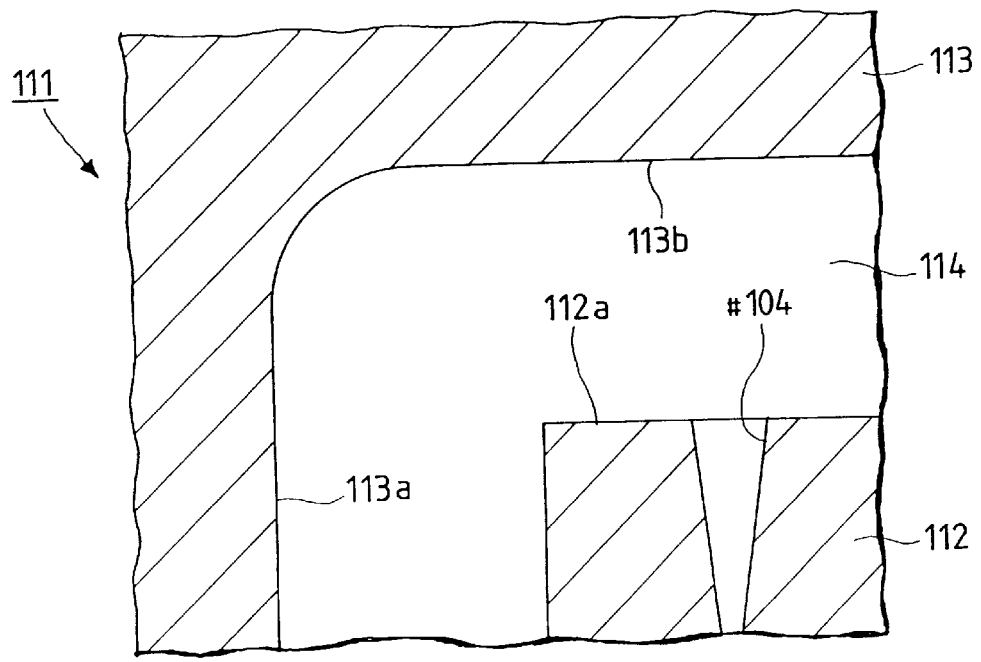
FIG. 18 is a sectional view of the mold unit for producing the console of a first example.

We now describe a mold unit used to form the substrate body 102 of the console box 101. As shown in FIG. 18, the mold unit 111 has a fixed mold 112 and a moving mold 113. The fixed mold 112 and the moving mold 113 have molding surfaces 112a and 113a, respectively, for forming the substrate body 102. The moving mold 113 has a setting surface 113b on which the elastic sheet 103 is to be set. When the two molds 112 and 113 are brought into contact with each other, the two molding surfaces 112a and 113b define a cavity 114 for molding the substrate body 102.

Figure 19:
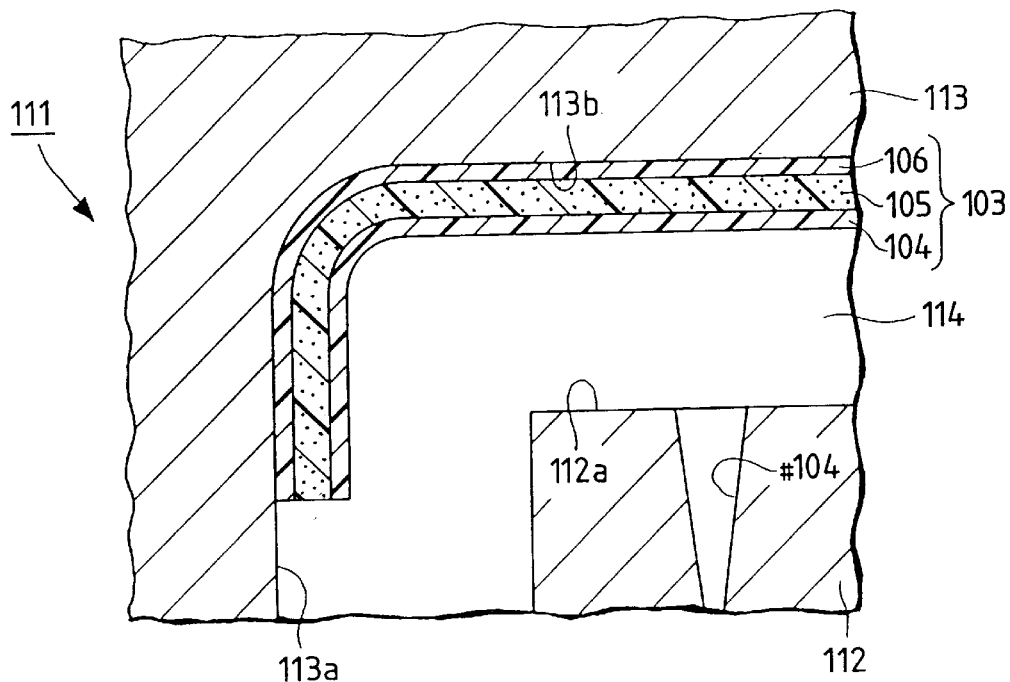
FIG. 19 is a sectional view of the mold unit with a plastic sheet set up in a predetermined area of the mold unit.

The fixed mold 112 has a plurality of gates (Nos. 101 to 106) that are open to the cavity 114 (only gate #104 is shown in FIG. 19). As shown clearly in FIG. 16, the gates (Nos. 101 to 106) are distributed in selected areas of the console box 101. Four of these gates (Nos. 101 to 104) are opposed to the area where the elastic sheet 103 is to be placed, and the remaining two gates (Nos. 105 and 106) are opposed to areas where the elastic sheet 103 is not to be placed. Channels in the mold unit 111 that lead to the gates (Nos. 101 to 106) are fitted with control valves (not shown) for permitting or interrupting the passage of a resin to the respective gates (Nos. 101 to 106). These control valves are adapted to open and close at predetermined times by means of a controller (not shown).

We now describe the process for producing the console box 101 in the embodiment under consideration. The process starts with fabricating the elastic sheet 103 which, as shown in FIG. 17, is a flat sheet that has three layers, the heat-fusible layer 104, the cushion layer 105 and the solid skin layer 106. Subsequently, the sheet is shaped to conform to the shape of the top surface of the console box 101 by a known vacuum forming technique. Thereafter, excess sheet is trimmed off. This sequence of steps completes the fabrication of the elastic sheet 103.

As shown in FIG. 19, the elastic sheet 103 is set at a predetermined site within cavity 114 (in its upper part) in the mold 111, with the solid skin layer 106 in the elastic sheet 103 being in contact with an inner surface of the mold 111.

Figure 20:
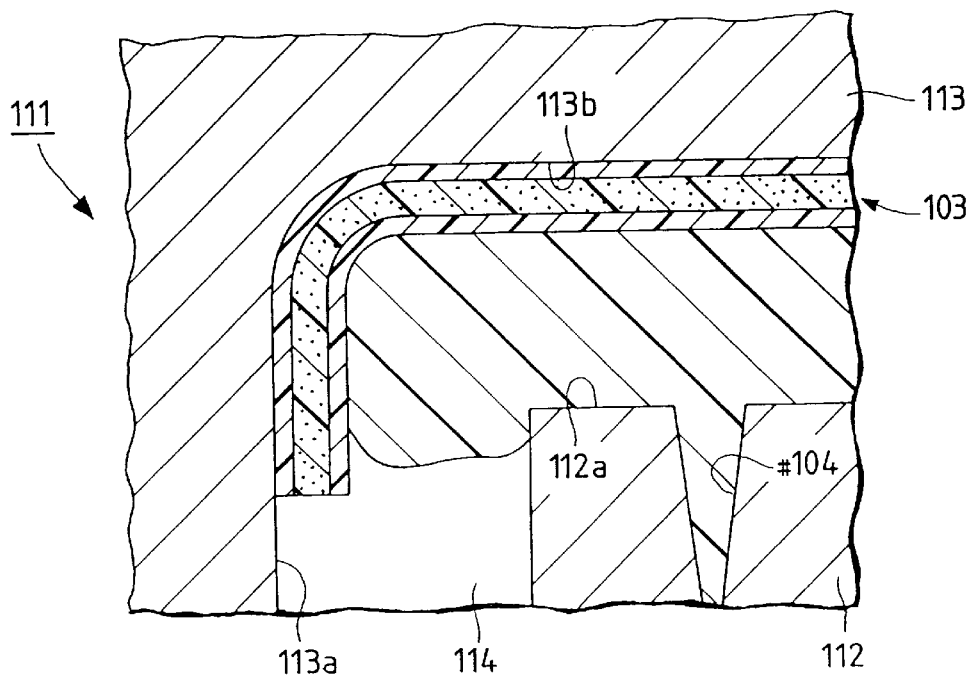
FIG. 20 is a sectional view of the mold unit with a resin being injected into the mold cavity.

Then, as FIG. 20 shows, plasticized, filler-loaded PP is injected from an injection molding machine (not shown) into the cavity 114 through the gates (Nos. 101 to 106), with the associated control valves being turned on and off at predetermined times by means of the controller. Stated more specifically, the control valves associated with gate Nos. 101 to 104, which are opposed to the elastic sheet 103, are first opened. After a predetermined time, the control valves associated with gate Nos. 105 and 106, which are not opposed to the elastic sheet 103, are opened. As a result, filler-loaded PP is injected into the cavity 114 through gate Nos. 101 to 104. After a predetermined time, the filler-loaded PP is injected through gate Nos. 105 and 106. As FIG. 20 shows, the filler-loaded PP (resin) that has been injected through gate Nos. 101 to 104 first flows outward along an edge of the elastic sheet 103 until it contacts the filler-loaded PP that has been injected through gate Nos. 105 and 106.

This process eliminates the possibility that elastic sheet 103 will be subjected to stress at an edge due to filler-loaded PP injected through gates Nos. 105 and 106 which are not opposed to the elastic sheet 103. In other words, the resin will not get into the space between the solid skin layer 106 of elastic sheet 103 and an inner surface of the mold 111. Thus, the elastic sheet 103 will not become curled up, and one source of defective parts can be eliminated.

Additionally, the delayed injection through certain gates (Nos. 105 and 106) allows the overall injection pressure and, hence, the cost of the mold 111, to be lowered.

Figure 21:
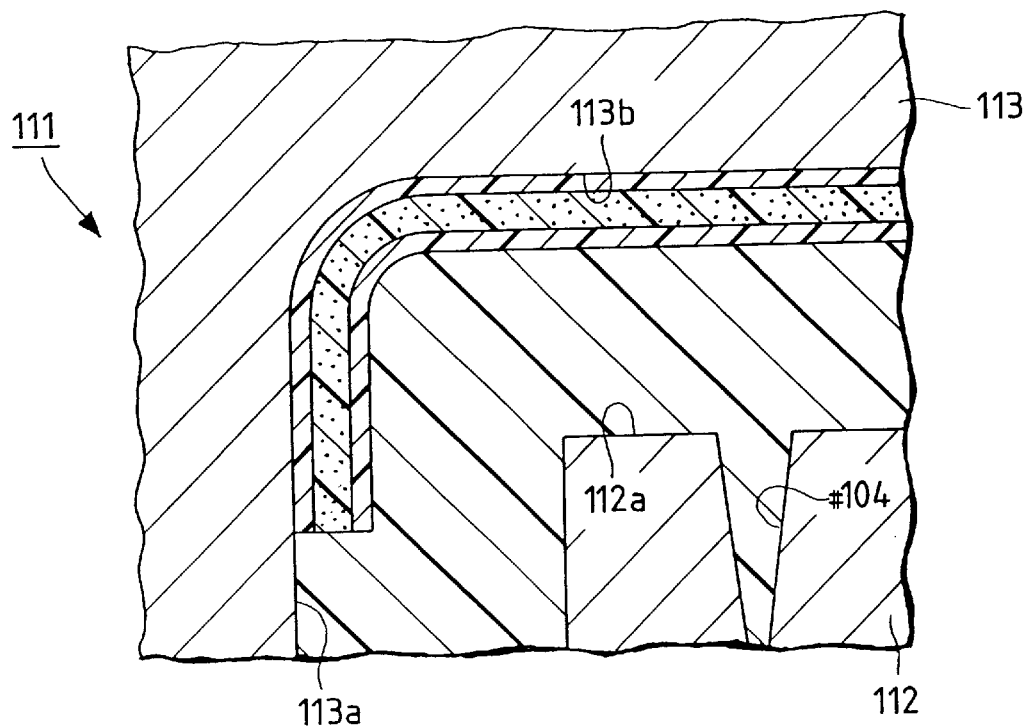
FIG. 21 is a sectional view of the mold cavity filled with injected resin.

Subsequently, as FIG. 21 shows, the cavity 114 is filled with the filler-loaded PP, whereupon the heat-fusible layer 104 softens with the heat of the filler-loaded PP. As the filler-loaded PP cools to solidify, the heat-fusible layer 104 is fused to the filler-loaded PP, causing the elastic sheet 103 and the filler-loaded PP (substrate body 102) to be joined together. Thereafter, the mold 111 is opened and the substrate body 102 with elastic sheet 103 mounted thereon is taken out of the mold to yield the complete console box 101.

With the console box 101 thus produced, its desired rigidity is assured by the substrate body 102 which is made of the filler-loaded PP. The cushion layer 105 in the elastic sheet 103 mounted on part of the substrate body 102 insures a soft feel to the touch whereas the solid skin layer 106 assures the anti-glare, weathering, heat-resisting properties, as well as the visual quality. Additionally, the heat-fusible layer 104 assures the adhesion between the elastic sheet 103 and the substrate body 102.

In the embodiment under consideration, the adhesion between the substrate body 102 and the elastic sheet 103 is assured by the heat-fusible layer 104 located in the innermost part of the elastic sheet 103. To ensure the adhesion between the substrate body 102 and the elastic sheet 103, the latter is set at the predetermined site in the mold 111 before forming the substrate body 102 in the manner described above. This eliminates not only the step of applying an adhesive to a surface of the substrate body 102, but also eliminates the step of bonding body 102 to elastic sheet 103. Additionally, there is no need to provide a special device such as a mold for bonding the two members. These features combine to help improve the efficiency of production of automotive instrument panels, while achieving marked reduction in the cost of their production.

In the second embodiment, the elastic sheet 103 is mounted only in the upper part of each side of the substrate body 102 and in a selected area of its top surface. In other words, the elastic sheet 103 is not mounted in those areas where an occupant's seat cushion is located on the right and the left sides of the console box 101. Hence, the use of the elastic sheet 103 is minimized. As a result, the cost of console box production is markedly reduced while, at the same time, the waste of resources is prevented.

It should be noted here that the invention is in no way limited to the embodiment described above and that part of its constitution may appropriately be modified in such a way as described in the third embodiment.

Embodiment 3

Figure 22:
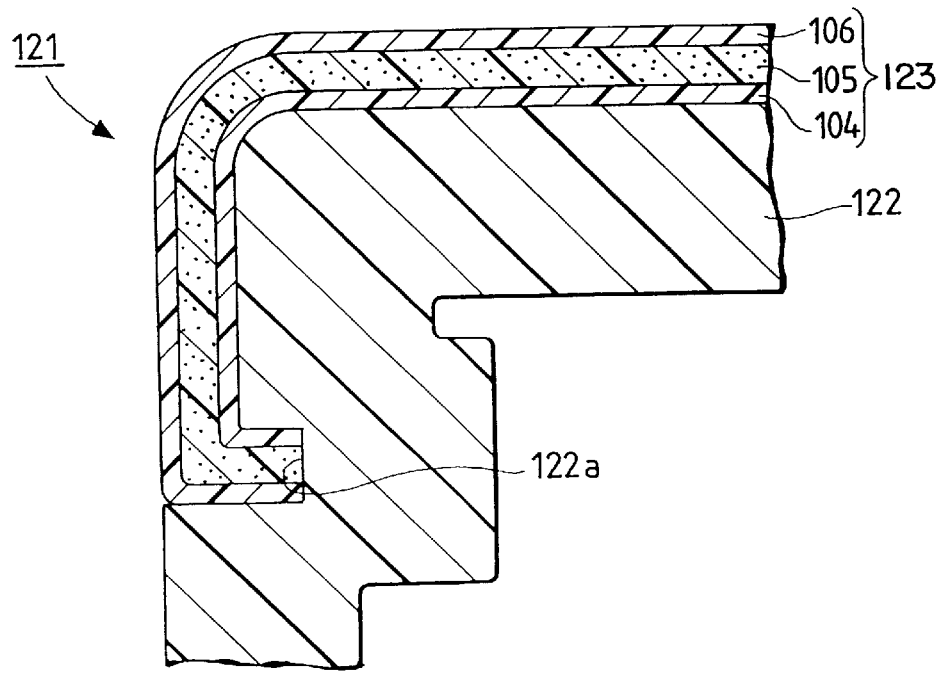
FIG. 22 is a sectional view of a console box according to a second example of the invention.

A third embodiment of the invention will now be described with reference to FIGS. 22 and 23. The principal part of the invention in the third embodiment is substantially the same as in the second embodiment and, hence, the following description will center on the differences between the two embodiments.

The third embodiment differs from the second embodiment in the following two points. First, the console box generally indicated by 121 in FIG. 22 has a recess or groove 122a formed in each side of the substrate body 122 and the elastic sheet 123 is mounted over the substrate body 122 in such a way that an end portion of sheet 123 is bent to fit within the recess 122a. Second, the elastic sheet 123 is so designed that the cushion layer 105 will be compressed during injection molding and expand upon removal from the mold. It should be noted that the substrate body 122 is flush with the elastic sheet 123 at the border between the two elements.

Figure 23:
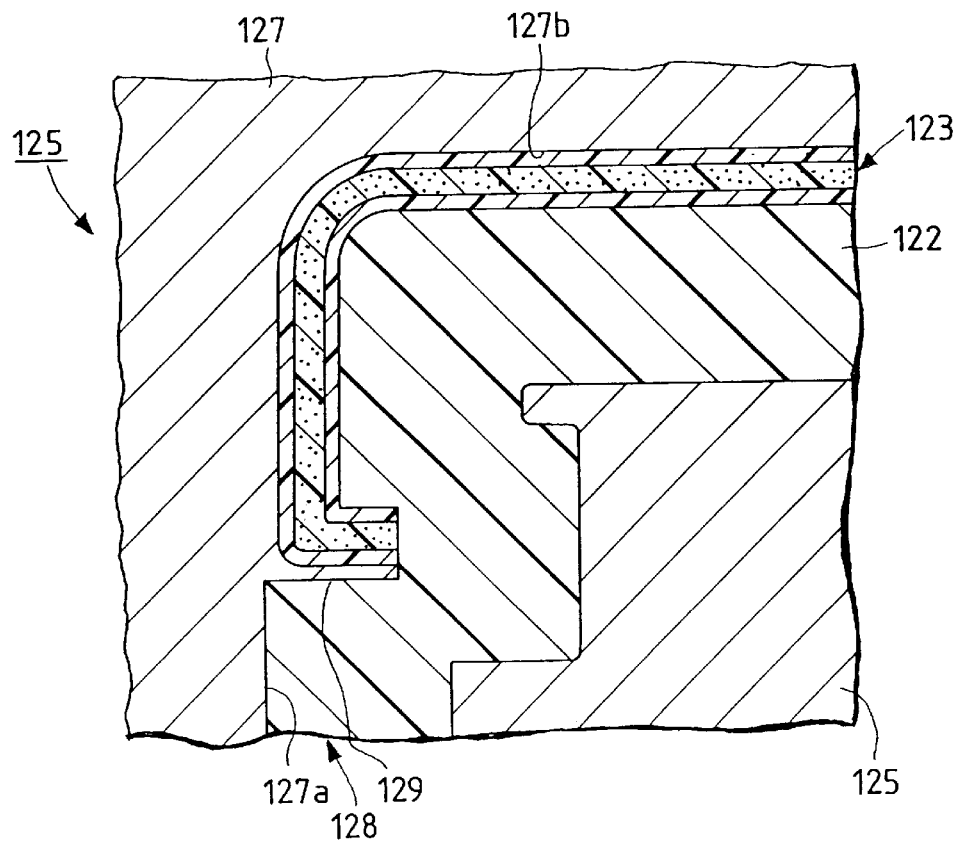
FIG. 23 is a sectional view of a mold unit with a resin being injected into the mold cavity as in the second example.

As FIG. 23 shows, a mold unit 125 for forming the console box 121 has a fixed mold 126 and a moving mold 127. The moving mold 127 differs from the moving mold 113 used in the first embodiment in that it has two split parts that will be separated apart to the right and left in FIG. 23. The moving mold 127 additionally has a ridge line 129 that protrudes into the cavity 128. To allow for the expansion of the elastic sheet 123 after its formation, the setting surface 127b of the moving mold 127 projects into the cavity 128 by a greater amount than the molding surface 127a where the substrate body 122 is to remain exposed.

We will now describe the method of forming the console box 121 in the third embodiment, as well as the action of the mold unit during formation. The method starts with setting up a preformed elastic sheet 123 on a predetermined site or setting surface 127b of the moving mold 127. An end portion of the sheet 123 is bent in such a way that it contacts the ridgeline 129.

Then, as in the second embodiment, a plasticized, filler-loaded PP is injected into the cavity 128 through gate Nos. 101 to 106 (not shown) at predetermined times. Again, the elastic sheet 123 will not be curled up and, additionally, the following advantage will result over the second embodiment.

Stated more specifically, the cushion layer 105 and, hence, the elastic sheet 123 is compressed under the pressure of the resin being injected. After the filler-loaded PP fills the cavity 128 and cools to solidify, the mold unit 125 is opened, whereupon the elastic sheet 123 is released from the resin pressure and expands. This yields a console box 121 in which the substrate body 121 is substantially flush with the elastic sheet 123 at the border (see FIG. 22).

Compared to the console box 101 of the second embodiment, the console box 121 provides a better and smoother parting appearance at the boundary between the elastic sheet 123 and the substrate body 122. In addition, the elastic sheet 123 has better adhesion to the substrate body 122 and there is less likelihood of its separation from the latter.

Embodiment 4

Figure 24:
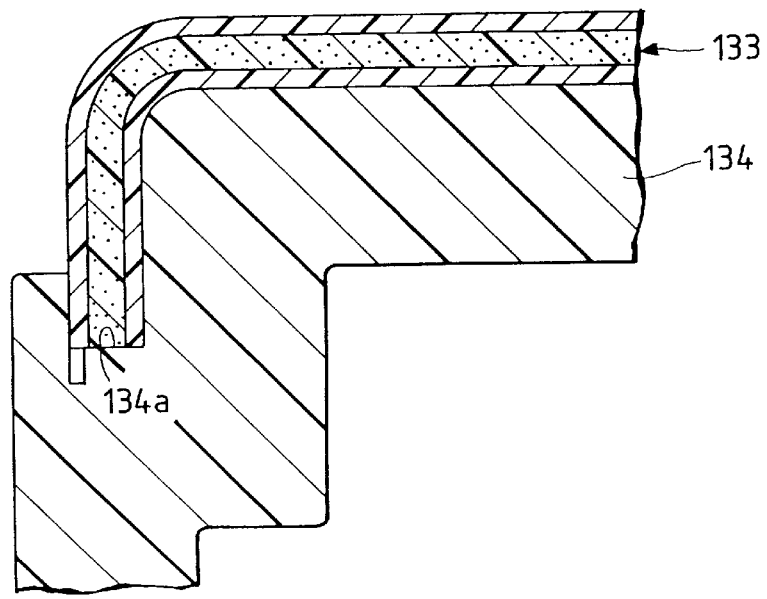
FIG. 24 is a section of a console box according to a third example of the invention.
Figure 25:
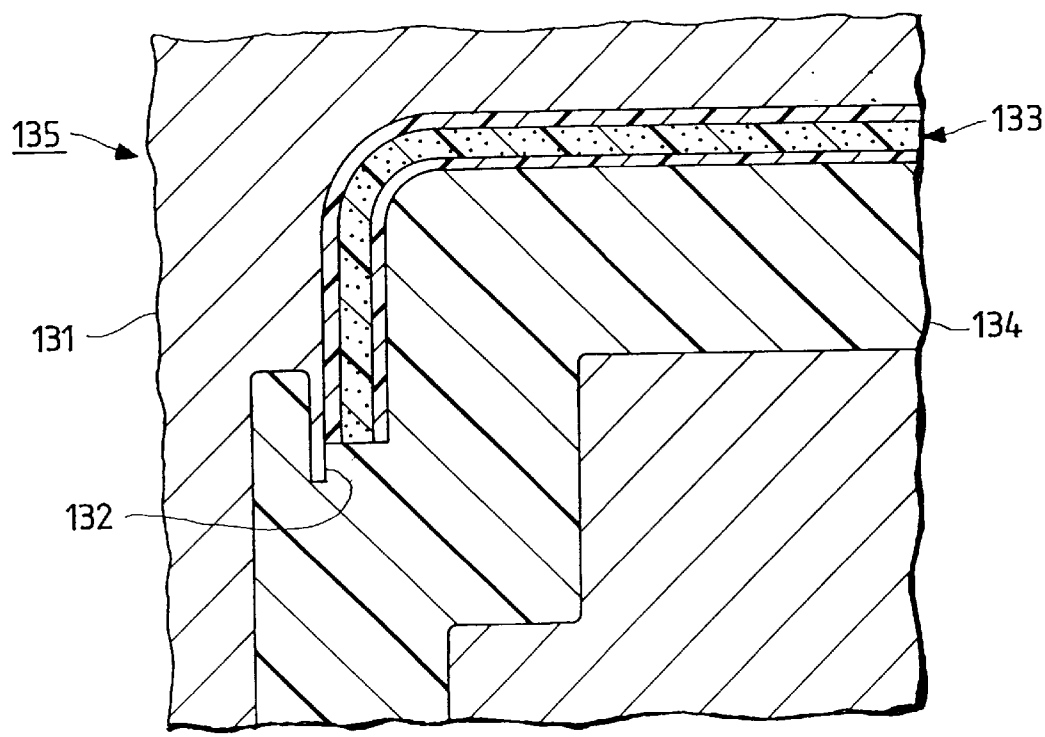
FIG. 25 is a section of a mold unit with a resin being injected into the mold cavity as the third example.

In the second and third embodiments, the moving mold 127 has to be designed as consisting of two split parts since the ridgeline 129 is formed as an undercut. Alternatively, a moving mold 131 may be provided in such a way that it is capable of vertical movement as seen in FIG. 25. A ridgeline 132 projecting downward is formed as an integral part of the mold 131. This modification has the advantage of permitting the use of the solid (unsplit) moving mold 131, whereby the overall layout of the mold unit 135 can be simplified. In another alternative approach, an end portion of the elastic sheet 133 may be positioned within a recess 134a in the substrate body 134 as shown in FIG. 24. Again, the boundary between the elastic sheet 133 and the substrate body 134 provides a good, smooth parting appearance and, at the same time, there is less likelihood for the elastic sheet 133 to separate from the substrate body 134.

Embodiment 5

Figure 26:
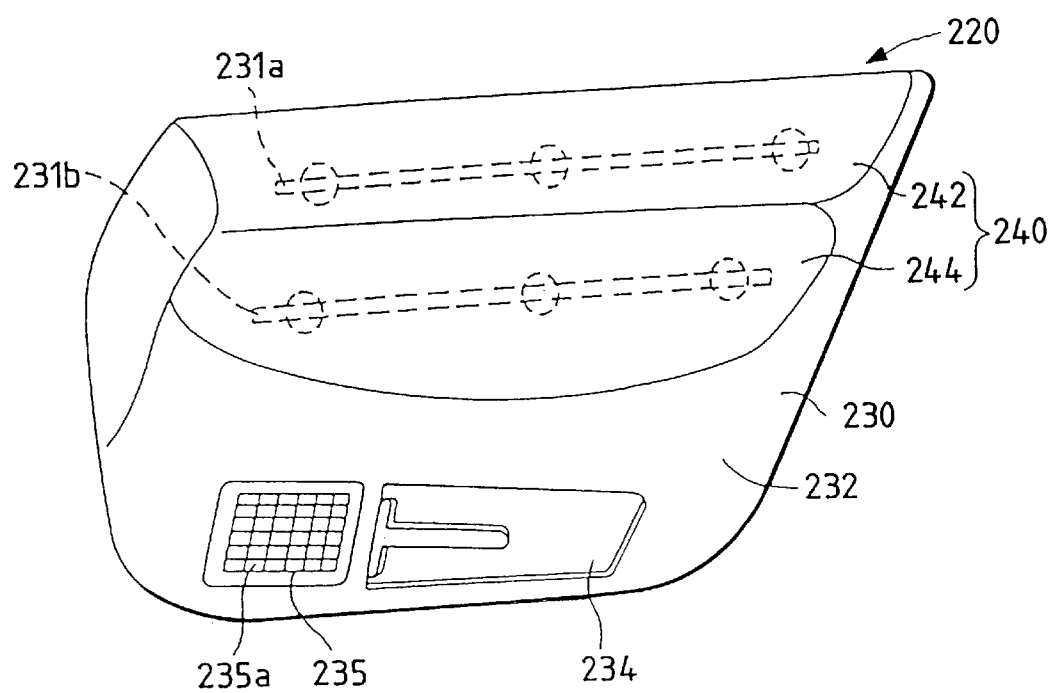
FIG. 26 shows the exterior appearance of an automotive door trim.
Figure 27:
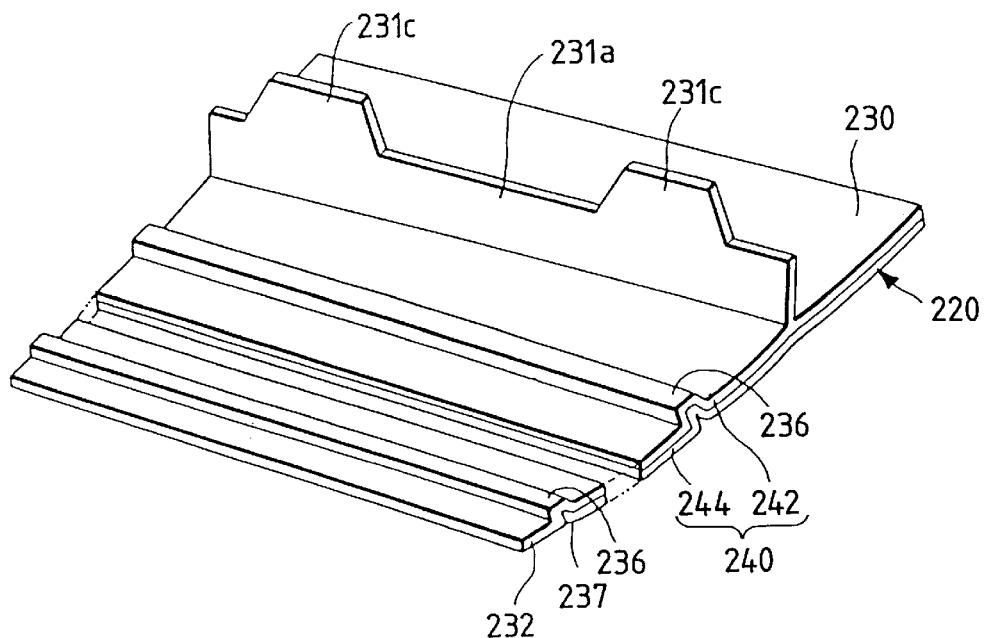
FIG. 27 is a perspective view showing the essential part of the back side of the door trim.

A fifth embodiment of the invention will now be described with reference to FIGS. 26 to 34. FIG. 26 is an exterior view of an interior automotive door trim 220 produced by the molding methods of the invention. As FIG. 26 shows, the door trim 220 has a substrate 230 and a decorative skin 240 that is thermally fused to part of a surface of the substrate 230.

The substrate 230 is formed of a hard resin material selected from among various suitable thermoplastic resins such as polypropylene (PP) and polyethylene (PE). Substrate 23 has a thickness of 2 to 3 mm. The substrate 230 serves as a structural base that is to be mounted on a door panel (not shown). To assure strength, the substrate 230 has ribs 231a and 231c (see FIG. 27) that extend parallel to each other in a substantially horizontal direction. That area of the substrate 230 which is not covered with the skin 240 is indicated by 232 and is an area of exposed hard resin. The exposed area 232 of the substrate 230 has an opening 234 in the lower part that is to be covered with another decorative member (not shown). A speaker grill 235 through which sound will come from a speaker is provided adjacent to the opening 234. The speaker grill 235 has a number of small through-holes 235a.

Figure 28:
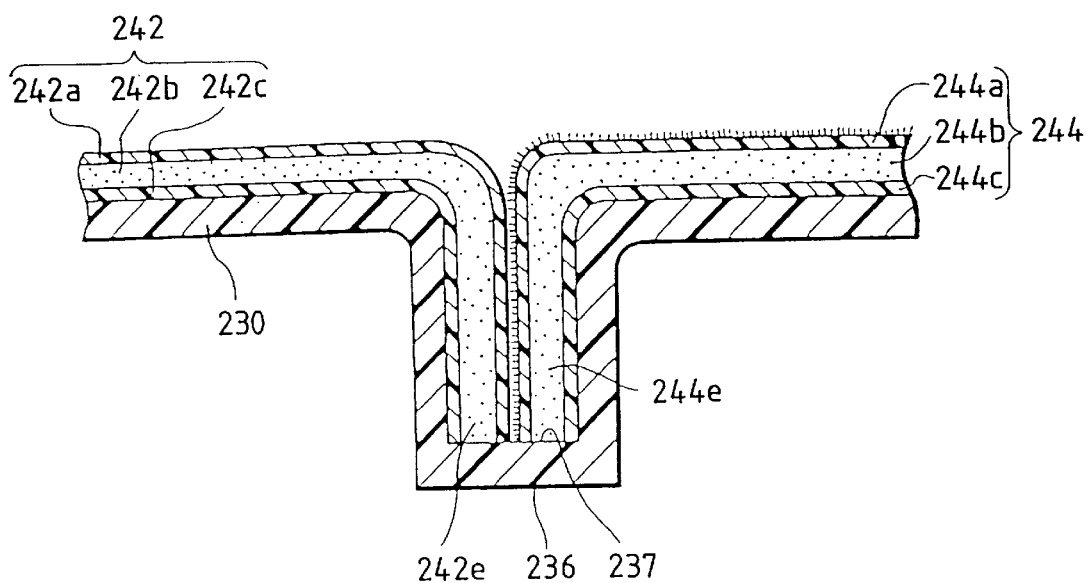
FIG. 28 is a sectional view showing the area around the joining edge portions of an upper skin and a lower skin.
Figure 29:
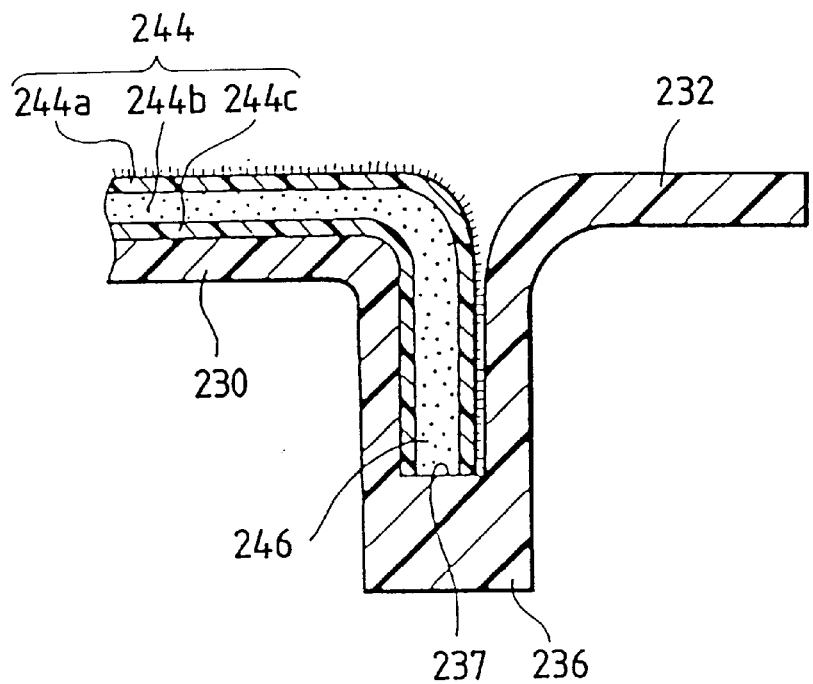
FIG. 29 is a sectional view showing the area around the outer peripheral edge portion of the lower skin.
Figure 30:
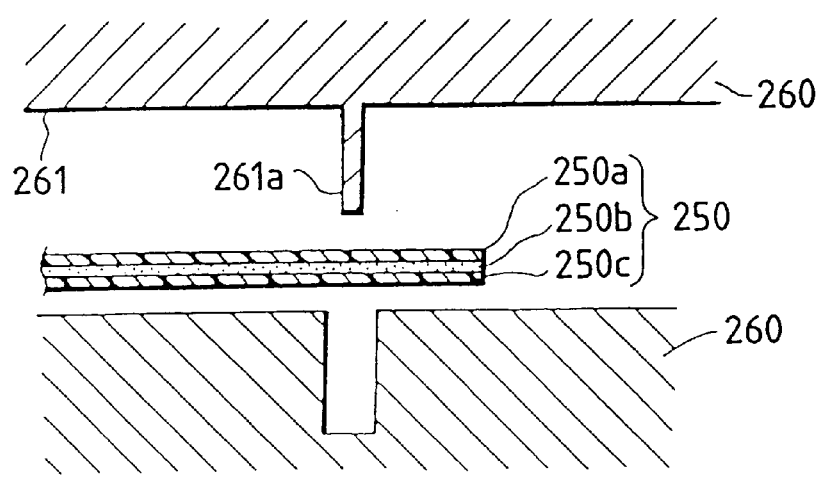
FIG. 30 is an illustration of a vacuum forming process.

The skin 240 has an upper skin 242 situated in the upper part of the substrate 230 and a lower skin 244 situated below the upper skin 242. Lower skin 244 is joined at its top end to the lower end of said upper skin 242. As shown in FIG. 28, the upper skin 242 consists of three layers, a skin layer 242a, a foamed layer 242b and a cover layer 242c, to provide an interior trim having a soft feel. Similarly, the lower skin 244 consists of three layers, a skin layer 244a, a foamed layer 244b and a cover layer 244c. Decorative bristles are embedded in the surface of the skin layer 244a.

The mating end portions of the upper skin 242 and the lower skin 244 are both bent to form joining end portions 242e and 244e that adhere to each other as shown in FIG. 28. The substrate 230 has a closing base 236 that surrounds the joining end portions 242e and 244e.

The boundary between the exposed area 232 of the substrate 230 and the lower skin 244 is formed in such a way that the outer peripheral edge portion 246 of the lower skin 44 will be situated within a recess or groove 237 (see FIG. 29) in the substrate 230.

We now describe the process for producing the door trim 220. First, a skin sheet 250 is formed for preparing the upper skin 242 and the lower skin 244 (see FIG. 30). The skin sheet 250 can be prepared by coextruding a skin layer forming sheet 250a, a foamed layer forming sheet 250b and a cover layer forming sheet 250 so that they are thermally fused together into a laminate. The respective sheets are made of thermoplastic olefinic resins (TPO) such as polyvinyl chloride (PVC) or polypropylene (PP). The lower skin 244 is formed from the same sheet 250 except that bristles are embedded in the surface of the skin layer forming sheet 250a.

Subsequently, the skin forming sheet 250 is given a predetermined shape by a known vacuum forming technique. Stated more specifically, both sides of the skin forming sheet 250 are heated to a predetermined temperature with a heater, and placed in position within a vacuum forming mold 260, and suction is applied by means of a vacuum pump, whereupon the sheet 250 is given a shape that conforms to the shaping surface 261 of the mold 260. The shaping surface 261 has a ridge 261a that will provide shape conforming to the closure portion 282a of a forming mold 280 to be described hereinafter (see FIG. 32). Since the vacuum forming technique is well known, its details need not be described.

Figure 31:
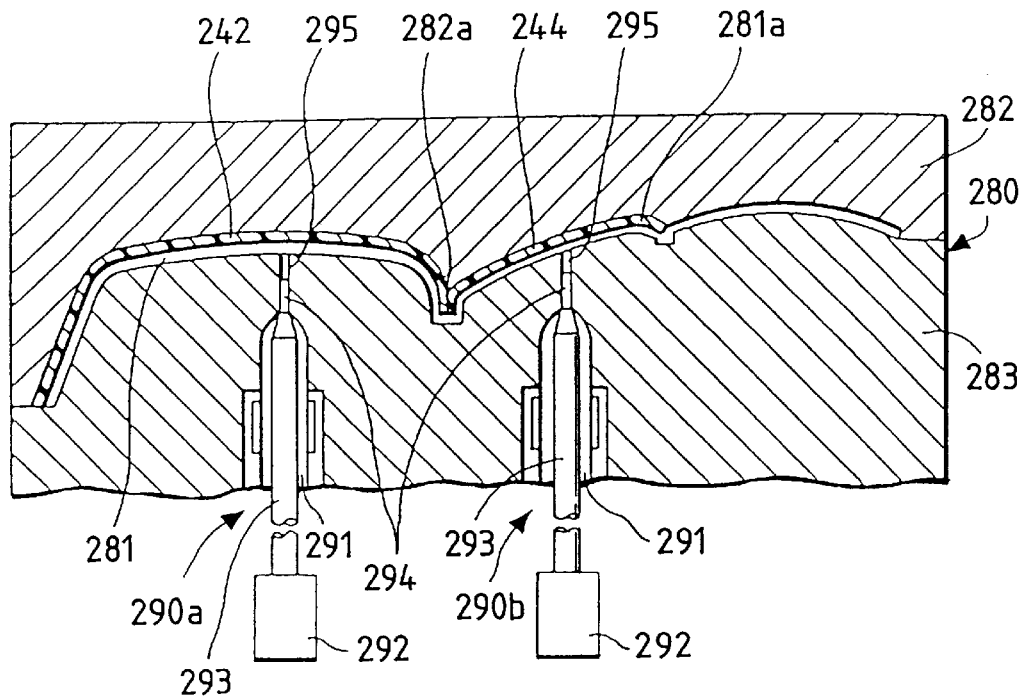
FIG. 31 is an illustration of an injection molding process.

In the next step, the substrate body 230 is formed as an integral part of the skin 240 by injection molding as shown in FIG. 31. Injection molding comprises injecting a molten resin into a cavity 281 in a mold 280 from a known injection molding machine through a first on/off gate 290a and a second on/off gate 290b. The mold 280 consists of a female part 282 and a core 283 that is to be fitted into a female part 282. For clamping, the female part 282 is advanced toward the core 283 and for mold opening, the female mold 282 is retracted from the core 283. Cavity 281 is formed as a result of clamping.

The first on/off gate 290a is provided at three sites in the core 283 that correspond to the upper skin 242. Similarly, the second on/off gate 290b is provided at three sites in the core 283 that correspond to the lower skin 244. The first and second on/off gates have the same mechanism and each comprises (1) a resin feed compartment 291 connected to an injection port (not shown) of the injection molding machine, and (2) a gate pin 293 that is advanced or retracted by means of hydraulic cylinder (or air cylinder) 292. Gate pin 293 establishes or blocks communication with the opening in the resin feed compartment 291. The resin feed compartment 291 is connected to the cavity 281 via a runner 294 and a gate 295. The runner 294 is provided in such a way as to form trapezoidal portions 231c (see FIG. 27) that are formed at opposite ends as integral parts of each of the ribs 231a and 231b of the substrate 230. When the gate pins 293 of the first and second on/off gates 290a and 290b are retracted from the openings of the runners 294 by means of the drive force of the hydraulic cylinders 292, a molten resin R is injected from the injection molding machine to flow into the cavity 281 via the resin feed compartments 291, runners 294 and gates 295.

Figure 32:
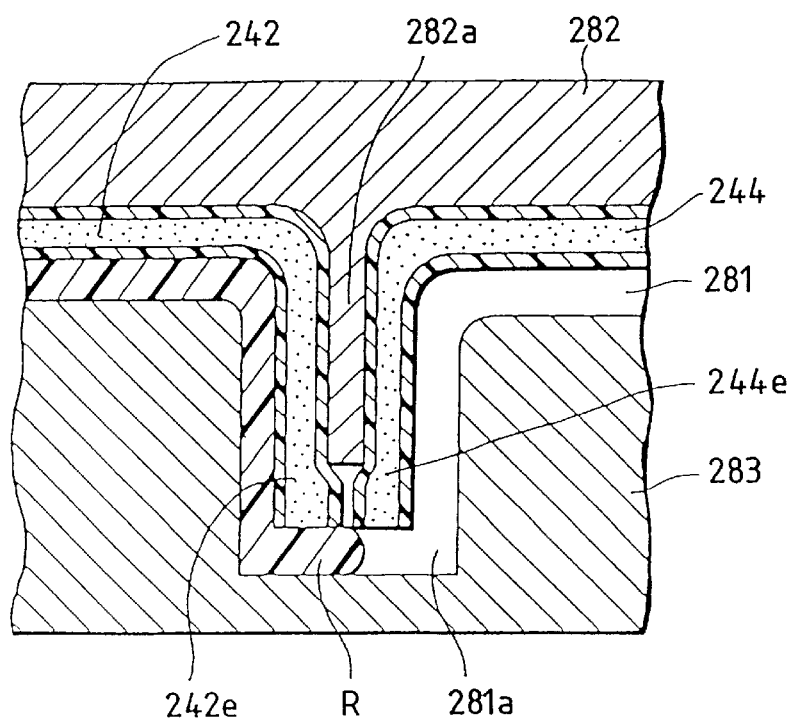
FIG. 32 is an illustration of the area around the joining edge portions of the upper skin and the lower skin, formed by injection molding.
Figure 33:
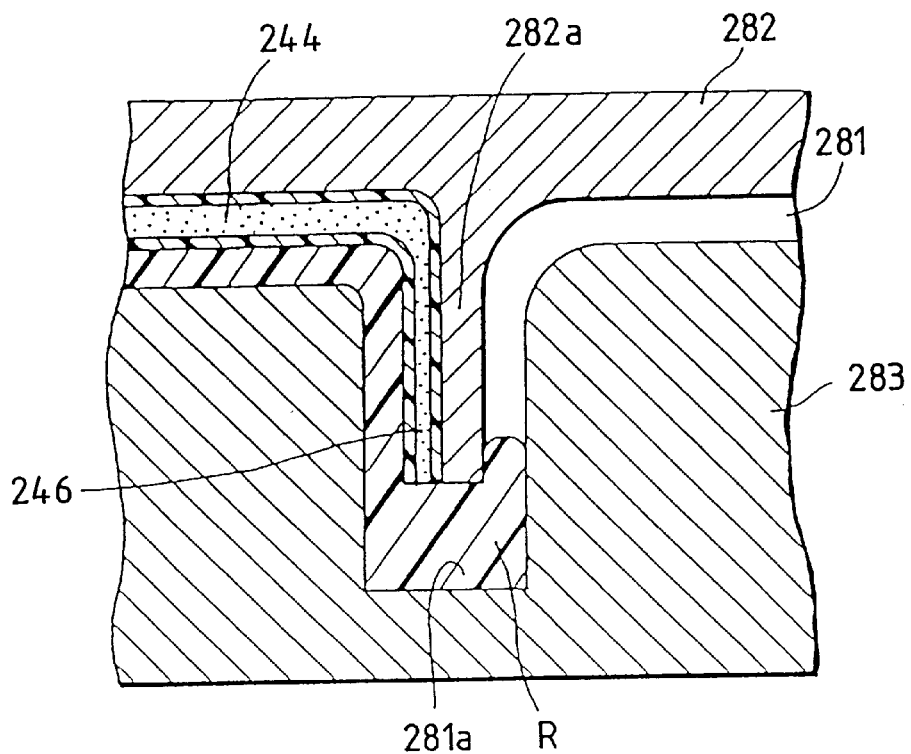
FIG. 33 is an illustration of the area around the outer peripheral edge portion of the lower skin, formed by injection molding.
Figure 34:
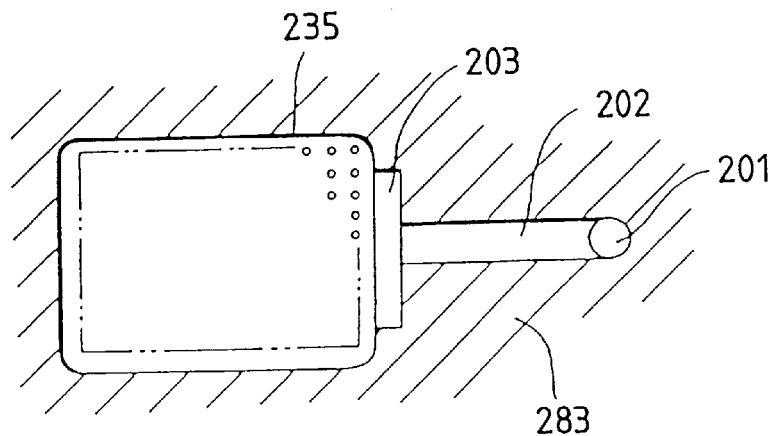
FIG. 34 is an illustration of the area around a speaker grill formed by injection molding.

The molding surface of the female part 282 has formed thereon closure portions 282a (see FIGS. 32 and 33) for assisting in the setting of upper skin 242 and lower skin 244. Female part 282 also has an injection port 201, a runner 202, and a film gate 203 (see FIG. 34) for assisting in the formation of the speaker grill 235. The closure portion 282a shown in FIG. 32 is formed to conform with the joining end portions 242e and 244e of the upper skin 242 and the lower skin 244, respectively. The closure portion 282a shown in FIG. 33 is formed to confirm with the outer peripheral edge portion 246 of the skin 240 other than the joining end portions 242e and 244e. The film gate 203 shown in FIG. 34 is connected to the runner 202 and it is wide enough to ensure that the pressure of the resin being injected through the runner 202 is lowered uniformly so that small through-holes 235a can be formed without burrs.

We next describe the step of injection molding in which the substrate 230 is formed superimposed on the skin 240. First, with female part 282 separated from the core 283, vacuum formed upper skin 242 and lower skin 244 are set in the female part 282. In this instance, the upper skin 242 and the lower skin 244 are set so that they conform to the closure portions 282a, whereby the joining end portions 242e and 244e of the upper skin 242 and lower skin 244, respectively, adhere to one another (see FIG. 32).

Subsequently, the core 283 is clamped to the female part 282 and injection of resin is performed to mold the substrate 230 (as shown in FIG. 31). The injection is delayed injection molding, in which injection through the first on/off gate 290a is followed by injection through the second on/off gate 290b, delayed by a predetermined time, e.g., one second. Stated more specifically, the gate pin 293 of the first on/off gate 290a is displaced and a molten resin is injected toward the upper skin 242 through the resin feed compartment 291, runner 294 and the gate 295. The molten resin flows through the cavity 281 as shown in FIG. 32 (in which the flowing resin is indicated by R). Then, at the time the advancing end of the molten resin R injected through the first on/off gate 290a has reached the second on/off gate 290b, another stream of the molten resin is injected through the second on/off gate 290b. The two streams of the molten resin are fused together to fill the cavity 281, thereby forming the substrate 230. A third stream of the molten resin is supplied through the injection port 201 and the runner 202 and the injection pressure is lowered uniformly at the film gate 203 so as to form the speaker grill 235 having small through-holes 235a.

When the molten resin cools to solidify, the mold is opened and the shaped resin part is removed and subjected to a post-treatment, thereby yielding a complete door trim 220. During the molding operation, the foamed layers 242b and 244b of the skin 240 were compressed under the closure portions 282a of the mold 280 but they will expand to their initial shape upon demolding and, as a result, the gap between the upper skin 242 and the lower skin 244 is effectively eliminated to provide a smooth parting line.

As described above, the molten resin is injected through the second on/off gate 290b at the time when the advancing end of the molten resin injected through the first on/off gate 290a has effectively reached the second on/off gate 290b. Hence, the two streams of the molten resin are fused together and no weld line will form even in the exposed area 232 of the substrate 230 which is not covered with the skin 240.

The molten resin R as injected toward the skin through the first on/off gate 290a and the second on/off gate 290b is not given high injection pressure since it passes through the runner 294 which assures sufficient distance from the skin 240. Hence, the skin 240 has no gate marks that will collapse the foamed layers 242b and 244b and this contributes to the good appearance of skin 240.

In the molding methods described above, the molten resin for shaping the substrate 230 is injected from the first on/off gate 290a and the second on/off gate 290b. Gates 290a, 290b are each provided in a plurality of positions that face the skin 240. Therefore, even if the molten resin R is injected at low pressure through the first and second on/off gates 290a and 290b, it will spread to every part of the substrate 230, which also includes the exposed area 232 which is not covered with the skin 240. Hence, the molten resin R being injected at low pressure through the first and second on/off gates 290a and 290b will not form gate marks in those areas of the skin 240 which face the gates 295 and, as a result, the shaped resin part has nothing to impair its appearance.

Additionally, the upper skin 242 and the lower skin 244 are set up in the mold 280 after they have been preformed in such a way that their joining end portions 242e and 244e conform to the closure portion 282a of the mold 280. This insures that those joining end portions 242e and 244e are not only positioned to correspond with the closure portion 282a, but 242c, 244c also adhere to one another. If injection molding is performed with the upper and lower skins being set in the manner just described above, there will be no burr-forming leakage of the molten resin R from between the joining end portions 242e and 244e and the door trim 220 produced has a good-looking parting line.

It should be noted here that the invention is by no means limited to the embodiments described above and it may be implemented in various other ways without departing from the spirit and scope of the invention, as exemplified by the following modifications.

A plurality of gates may be provided in such a way that one of them is in a position facing the skin whereas the other is in the position where there is no skin and injection is performed in such a way that the molten resin injected through one gate and the molten resin injected through the other gate will contact each other in the exposed area of the substrate (i.e., the area exterior to an edge of the skin). Thus, this will avoid the defect of curling of the skin caused when molten resin injected through one gate flows between the skin 240 and the surface of mold half 282.

In the fifth embodiment, the timing of injection through the second on/off gates 290b is delayed relative to the first on/off gate 290a. If desired, the injection port 201 for injection molding the speaker grill 235 may be fitted with on/off gates similar to the first or second on/off gate 290a or 290b so that molding is performed at a time delayed relative to the second on/off gate 290b.

In the fifth embodiment, a three-layered skin is formed over the substrate but this is not intended to be limiting. Various other structures may be employed, as exemplified by a simple structure comprising a hard skin layer and a dual structure having a hard skin layer lined with a soft foamed layer.

As described on the foregoing pages, the fifth embodiment is characterized in that a molten resin for shaping the substrate is injected through a plurality of gates provided in positions that face the skin. This assures that even if the molten resin is injected at low pressure through one gate, it will spread sufficiently to shape an automotive door trim having a large enough area to include the exposed portion which is not covered with the skin. Hence, no gate marks that impair the appearance of the shaped resin part will be formed in any portion of the skin.

Further, the first gate or gates are provided in positions that face the skin whereas the second gate or gates are provided in positions that face the non-skin areas, so that the molten resin injected through the first gate or gates and the molten resin injected through the second gate or gates will contact each other in the exposed area of the substrate (i.e., the area exterior to an edge of the skin). Hence, curling of the skin is avoided.

Still further, in the fifth embodiment, at least two gates are provided at the site that faces the skin and at the time when the advancing end of the molten resin injected through a first gate has substantially reached a second gate, another stream of the molten resin is injected through the second gate. The two flows of the molten resin are fused together and no weld line will form at the joint of the two melt flows even in the exposed area of the substrate which is not covered with the skin.

Also in the fifth embodiment, a first and a second skin are preformed before being superimposed on a substrate. The first and the second skin are set to conform to closure portions of a shaping mold. Since the first and the second skins have been preformed, when they are set in the mold, they are positioned along the closure portions, and their respective joining end portions will adhere to one another. When a molten resin is subsequently injected toward the back side of the first or the second skin, the resin will not leak out the joint formed by the skins but, instead, the end portions will adhere to one another to a sufficient degree to provide a smooth, good-looking parting line.

Embodiment 6

Figure 35:
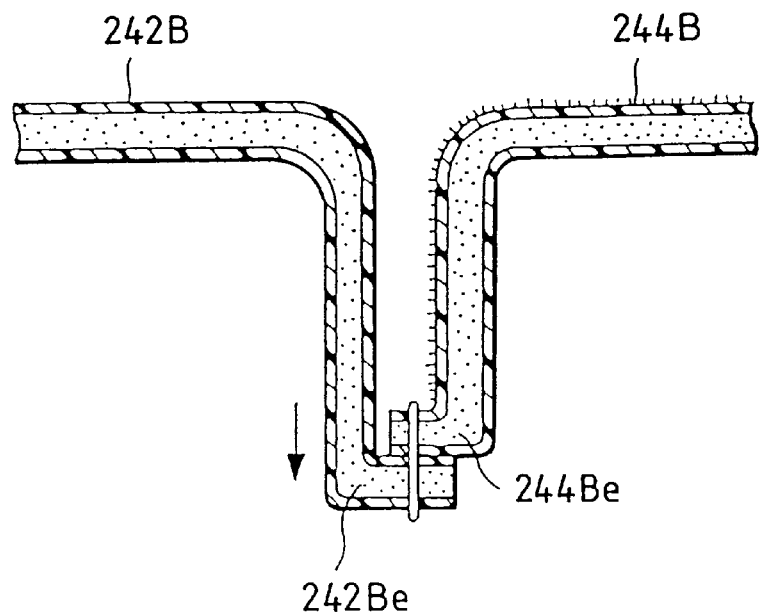
FIG. 35 is a sectional view showing another method of joining a plurality of skins according to the present invention.
Figure 36:
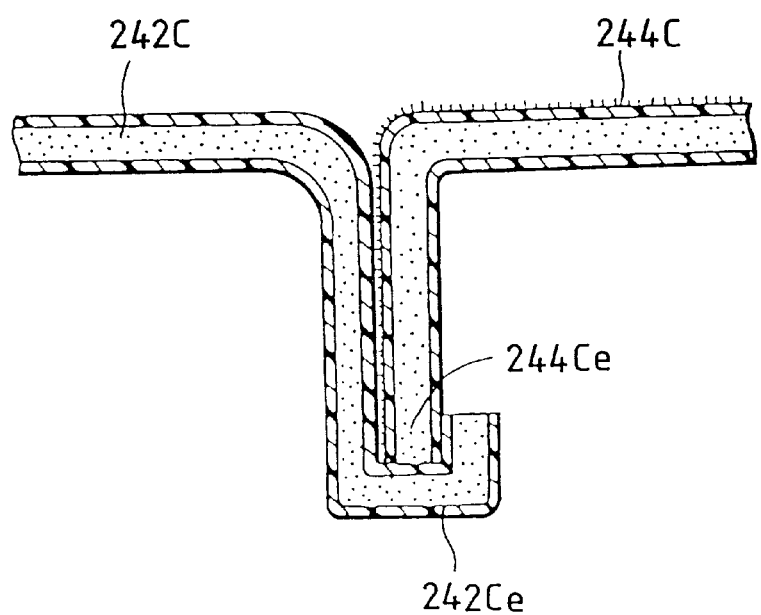
FIG. 36 is a sectional view showing still another method of joining a plurality of skins in the invention.

If desired, the adhesion between the joining end portions 242e and 244e of the upper skin 242 and the lower skin 244, respectively, may be enhanced by adopting the method illustrated in FIG. 35 or 36. According to the method shown in FIG. 35, a joining end portion 242Be of the upper skin 242B is bent and allowed to overlap an equally bent joining end portion 244Be of the lower skin 244B. Thereafter, the overlapping end portions 242Be and 244Be are sewn together. The sewing operation may be performed before or after the step of vacuum forming the skin forming sheet as long as the upper skin 242B and the skin layer 244a are yet to be set in the mold for the injection molding process. This insures that even if the molten resin is injected at high pressure, it will not leak out from between the joining end portions 242Be and 244Be, and one can produce a product of good appearance. If the molten resin is supplied in the direction indicated by arrow (see FIG. 35) along the straight joining end portion of the upper skin 242B, the injection pressure of the molten resin will not work in a direction that causes the joining end portion 242Be of the upper skin 242B to curl up and this contributes to a greater effectiveness in the prevention of resin leakage.

According to the method shown in FIG. 36, the leakage of the molten resin from between the joining end portions 242Ce and 244Ce of the upper skin 242C and the lower skin 244C, respectively, is prevented by bending the joining end portion 242Ce in such a way that it is turned up around the other joining end portion 244Ce. If vacuum forming is done with the joining end portions 242Ce and 244Ce overlapping each other, the two end portions will be thermally fused together to produce an even stronger joint.

Embodiment 7

Figure 37:
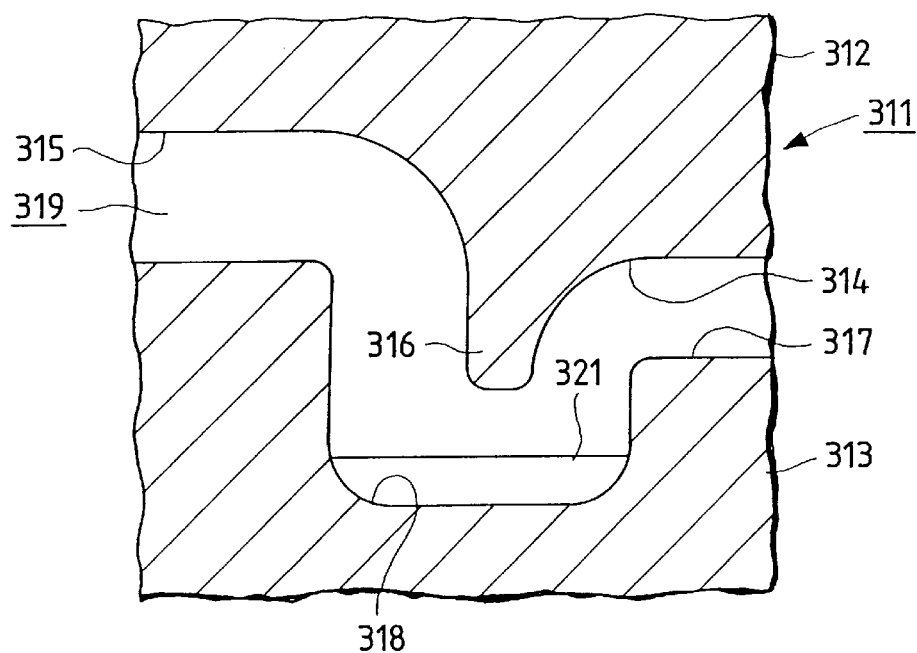
FIG. 37 is an enlarged section of a mold unit for shaping an instrument panel.
Figure 38:
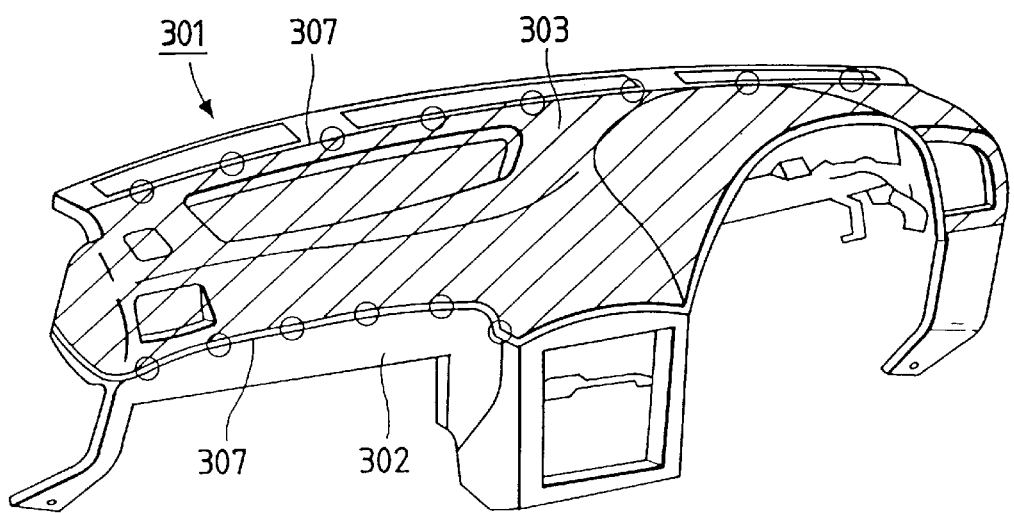
FIG. 38 is a perspective view of the instrument panel.
Figure 39:
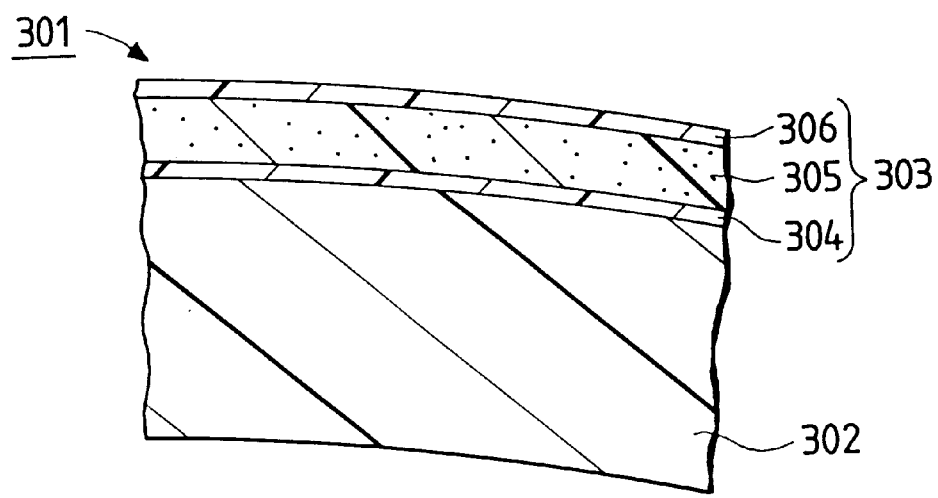
FIG. 39 is an enlarged section of the instrument panel.
Figure 40:
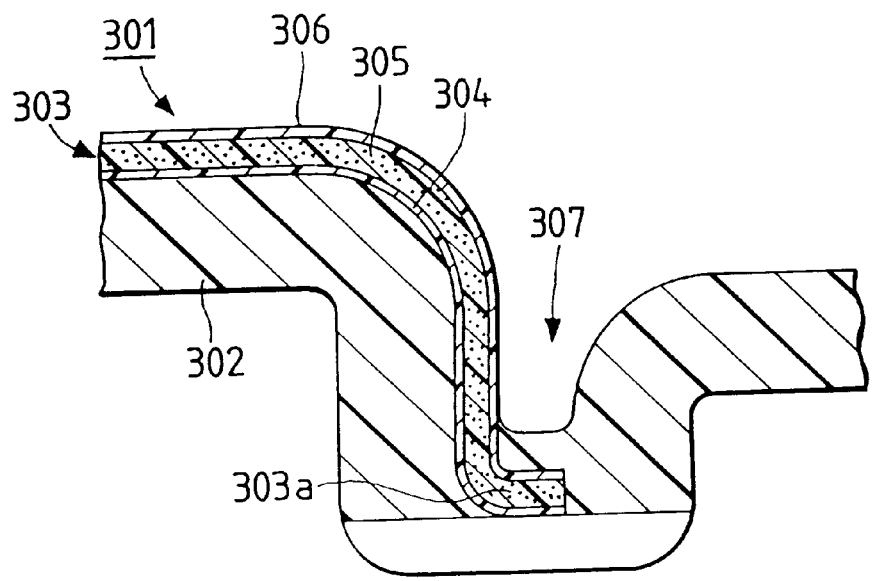
FIG. 40 is a partial section of the area around the groove in the instrument panel.

A seventh embodiment of the invention will now be described with reference to FIGS. 37 to 43. As FIGS. 38 and 40 show, a groove 307 is formed in predetermined areas of the substrate body 302. In the embodiment under discussion, the elastic sheet 303 is provided in such a way that part of its edge portion 303a is aligned with the groove 307.

We now describe a mold unit used to form the substrate body 302 of the instrument panel 301. As shown in FIG. 37, the mold unit generally indicated by 311 comprises a moving part 312 serving as the first mold part and a fixed part 313 serving as the second mold part. The moving part 312 is provided in such a way that it is capable of approaching or departing from the fixed part 313. The moving part 312 comprises a first molding surface 314 for forming part of the substrate body 302, a setting surface 315 on which the elastic sheet 303 is to be set, and a ridge 316 for forming the groove 307. The fixed part 313 comprises a second molding surface 317, and a recess 318 for forming the groove 307. When the moving part 312 contacts the fixed part 313 to bring the first molding surface 314 into alignment with the second molding surface 317, a cavity 319 for forming the substrate body 302 is defined.

Additionally, the bottom of the groove forming recess 318 in the fixed part 313 has an integral rib 321 that protrudes upward and extends across the width of the recess 318. The rib 321 is disposed at a plurality of sites that correspond to the areas indicated by broken line "dot-dot-dash" circles in FIG. 38.

The fixed part 313 has at least one gate that is open to the cavity 319.

Figure 41:
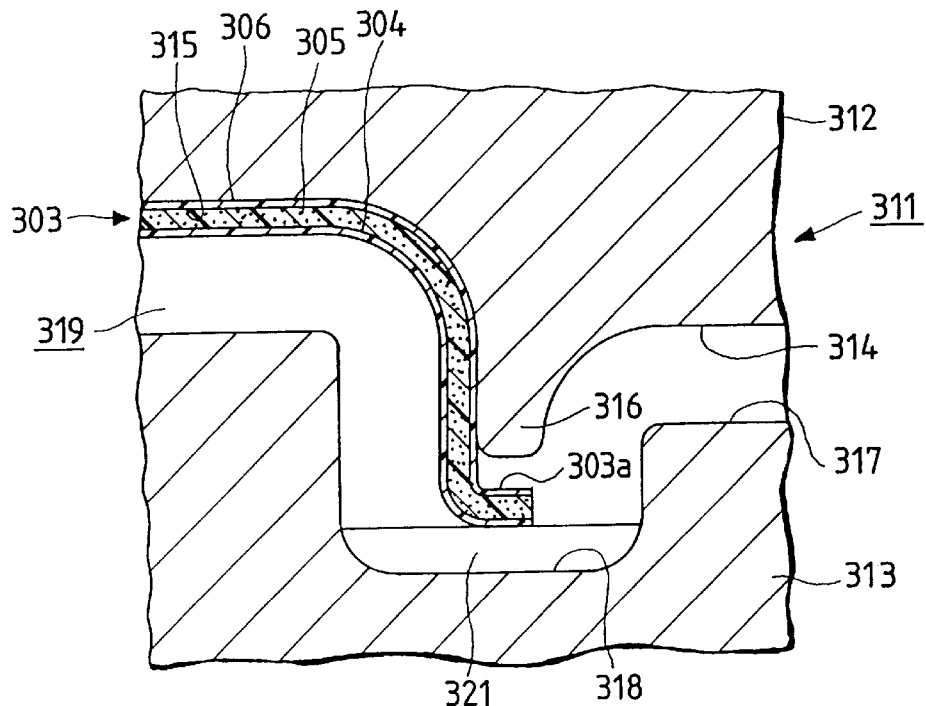
FIG. 41 is a partial section of a mold unit with the elastic sheet set up for shaping the instrument panel.

Then, as FIG. 41 shows, the preformed elastic sheet 303 is set at a predetermined site within the cavity 319 in the mold unit 311. Stated more specifically, the two mold parts 312 and 313 are separated and the elastic sheet 303 is set so that it contacts the setting surface 315 of the moving part 312 and that part of the end edge portion 303a of the sheet 303 (which is located within the groove 307) adheres effectively to the groove-forming ridge 316. Thereafter, the moving part 312 is brought into contact with the fixed part 313. As a result, the elastic sheet 303 is set with the solid skin layer 306 contacting the setting surface 315.

Figure 42:
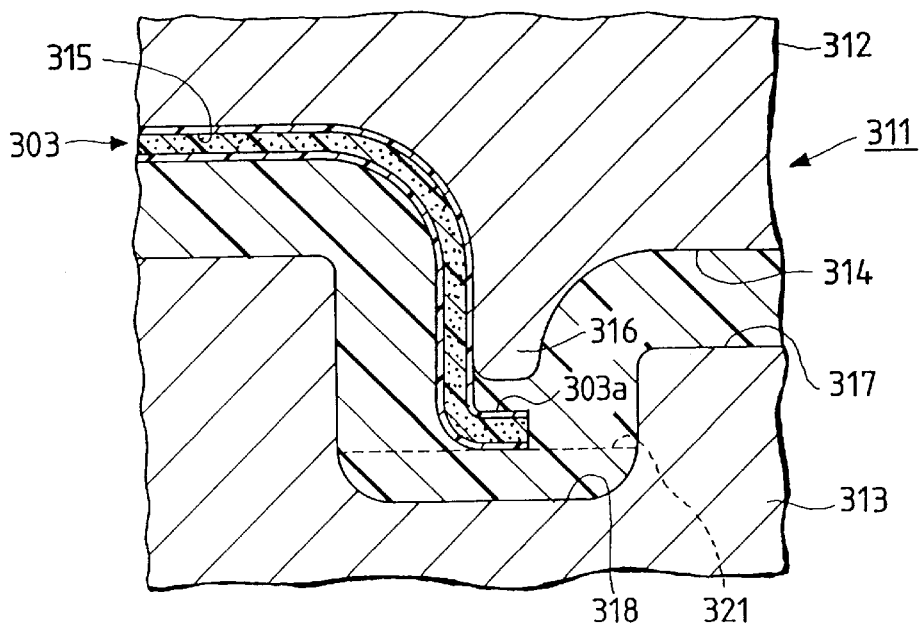
FIG. 42 is a sectional view showing how the mold unit with a resin injected into the cavity looks in the area where no ribs are provided.
Figure 43:
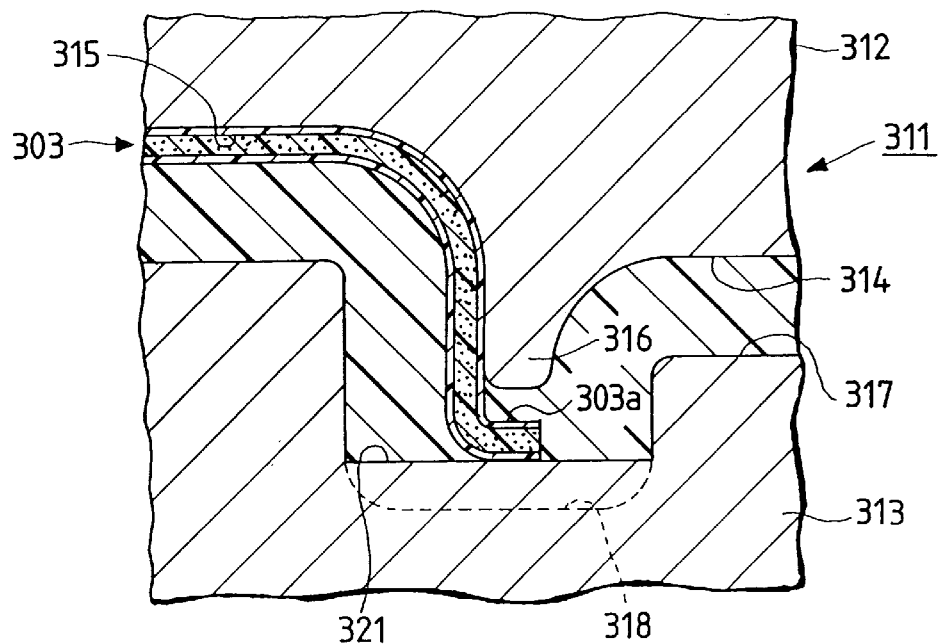
FIG. 43 is a sectional view showing how the mold unit with a resin injected into the cavity looks in the area where ribs are provided.

Subsequently, as FIGS. 42 and 43 show, a plasticized, filler-loaded PP (resin material) is injected from an injection molding machine (not shown) into the cavity 319 through the gates. Thereafter, the injected resin material fills the cavity 319, whereupon the heat-fusible layer 304 softens with the heat of the resin material. As the resin material later cools to solidify, the heat-fusible layer 304 is fused to the resin material, causing the elastic sheet 303 and the resin material (substrate body 302) to be joined together. Thereafter, the two mold parts 312 and 313 are separated apart and the substrate body 302 having the elastic sheet 303 mounted thereon is taken out of the mold to yield the complete instrument panel 301.

With the instrument panel 301 thus produced, its desired rigidity is assured by the substrate body 302 which is made of the filler-loaded PP. The cushion layer 305 in the elastic sheet 303 mounted on part of the substrate body 302 insures a soft feel to the touch, whereas the solid skin layer 306 assures the anti-glare, weathering, heat-resisting, visual quality and other desirable properties. Additionally, the heat-fusible layer 304 assures the adhesion between the elastic sheet 303 and the substrate body 302.

In the embodiment under consideration, the groove 307 is formed in part of the substrate body 302 of the instrument panel 301 and the elastic sheet 303 is disposed so that part of its end edge portion 303a is aligned with the groove 307 (see FIG. 40). Because of this design, the boundary between the elastic sheet 303 and the exposed surface of the substrate body 302 provides a good and smooth parting appearance, contributing to an improvement in the visual quality of the instrument panel.

Additionally, the rib 321 is erected in the groove forming recess 318 in the moving part 312. Therefore, even if the elastic sheet 303 slips or stretches by itself during the formation of the substrate body 302, the end edge portion 303a of the sheet 303 will contact the rib 321 and bend parallel to the direction in which the resin material flows (see FIGS. 42 and 43). As a result, the end edge portion 303a of the elastic sheet 339 is prevented from contacting the bottom of the groove-forming recess 318 and the resin material will positively reach that part of the recess 318 where no ribs are provided. Hence, the completed instrument panel 301 has no part that is solely composed of the elastic sheet 303 as seen across the thickness of the panel along the groove 307. In other words, the instrument panel 301 has the substrate body 302 present at every site as seen across the thickness along the groove 307. Thus, the substrate body 302 contributes desired strength and rigidity to the instrument panel 301 in areas where the grooves 307 are formed.

It should be noted here that the invention is by no means limited to the seventh embodiment described above and that part of its constitution may appropriately be modified as follows without departing from the spirit and scope of the invention.

In the seventh embodiment, the substrate body 302 is formed of a filler-loaded PP but it may be solely composed of PP. If desired, it may be composed of any other thermoplastic resins (e.g. ABS resins) that develop intended rigidity as they solidify.

Elastic sheet 303 is comprised of the heat-fusible layer 304, cushion layer 305 and the solid skin layer 306. However, the elastic sheet 303 may have any number of layers as long as they are made of a suitable material that permits use as a skin.

If desired, the relative positions of the fixed part 313 and the moving part 312 may be reversed from the state that is shown in the drawings.

The resin product is an instrument panel 301 according to this embodiment but the concept of this embodiment may also be applied to other resin products including a door trim, a side garnish, a pillar garnish, etc.

In the present embodiment, rib 321 or 22 is provided at more than one site in the groove forming recess 318 but the rib suffices to be formed in at least one location-in the recess.

The invention is embodied as a case where the substrate body 302 is formed by injection molding but it may be embodied where the substrate body 302 is formed by a so-called "stamping" process.

Further, a plurality of ribs are provided in spaced positions over the substantial length of the groove. This design assures that the elastic sheet will not penetrate through the substrate body to become exposed at the back side thereof, whereby the drop in the strength and rigidity of the shaped resin product can be positively prevented.

As described in detail above, when forming a shaped resin product comprising a substrate body and an elastic sheet thermally fused to a surface thereof, one can not only improve the visual quality of the product but also ensure against the drop in its strength and rigidity which would otherwise occur if the elastic sheet slips or stretches by itself during forming.

Embodiment 8

An eighth embodiment of the invention will now be described with particular reference made to FIGS. 44 and 45. Those parts of the eighth embodiment which are the same as the part of the seventh embodiment will not be described in detail and the following description centers on the differences between the two embodiments.

Figure 44:
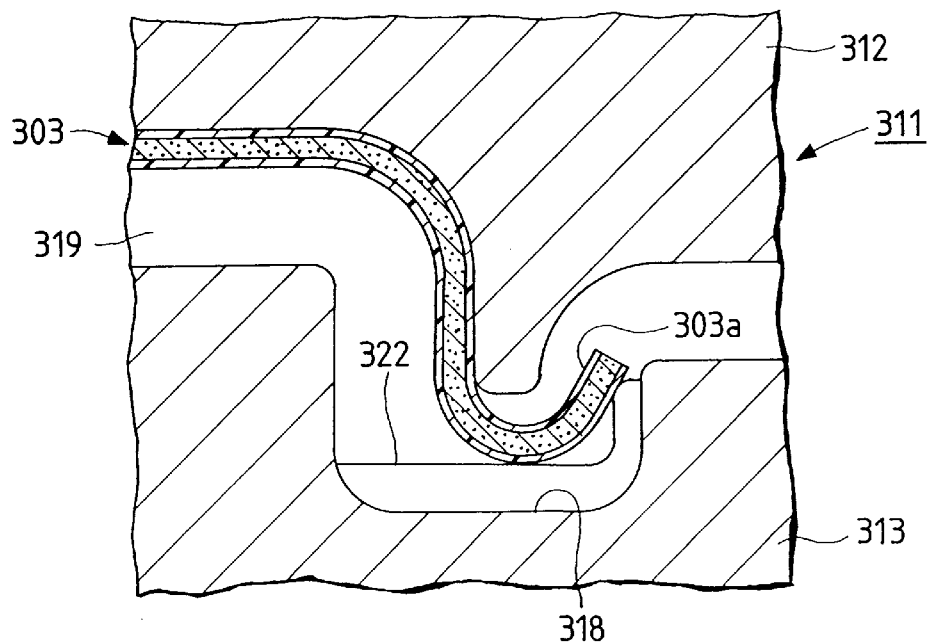
FIG. 44 is an enlarged section of a mold unit for shaping an instrument panel.

The biggest difference is that in the eighth embodiment, a rib indicated by 322 in FIG. 44 extends to the sidewall of the groove forming recess 318 on the opposite side of the area where the elastic sheet 303 is provided.

Figure 45:
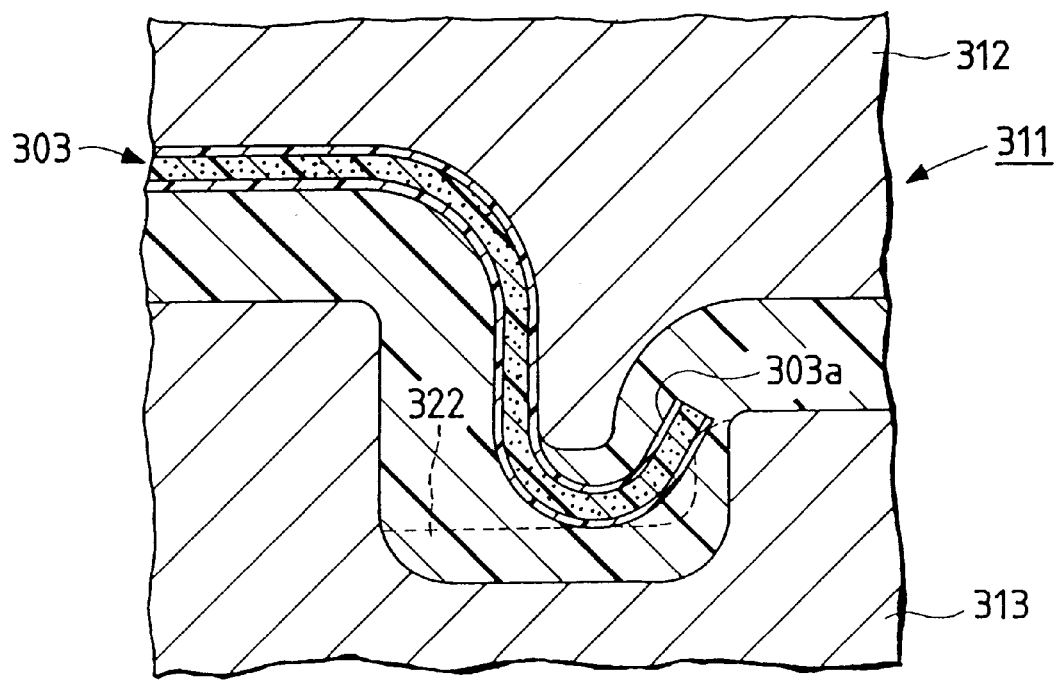
FIG. 45 is a partial section showing how mold parts operate when forming an instrument panel.

The advantage of this design is that even if the elastic sheet 303 slips or stretches by itself during the formation of the substrate in a greater amount than in the seventh embodiment, the end edge portion 303a of the sheet 303 will contact the rib 322 and bend along it parallel to the direction in which the resin material flows (see FIG. 45). As a result, the end edge portion 303a of the elastic sheet 303 is prevented from contacting the bottom of the groove forming recess 318 and the resin material will positively reach that part of the recess 318 where no ribs are provided. Hence, the end edge portion 303a will not become exposed on the back side of the formed substrate body 302. Therefore, even if the elastic sheet 303 slips or stretches by itself in a greater amount than in the seventh embodiment, the instrument panel 301 fabricated will assure the desired strength and rigidity in areas where the grooves 307 are formed.

What is claimed is:

1. A method of molding a resin part having a substrate and a skin thermally fused to a surface of said substrate, said method comprising the steps of:

providing a mold having an inner surface and defining a cavity therein;

positioning the skin having an edge portion at a site within the cavity so that the skin is in contact with the inner surface, the skin further having a multi-layer construction including a heat fusible layer, a cushion layer formed on said heat fusible layer, and a solid skin layer formed on said cushion layer, wherein said mold comprises:

(a) a first mold half having
  (i) a first molding surface for forming part of said substrate; and
  (ii) a ridge, disposed in said site for forming a part of a groove structure in said substrate adjacent said edge portion; and (b) a second mold half, having a second molding surface for forming a remaining part of said substrate, having a recess disposed substantially opposite said ridge of said first mold half, for forming a different part of the groove structure of the substrate, at least one rib being provided in said recess extending across said recess, and wherein said skin is positioned within said cavity so that at least a portion of said edge portion is in contact with said ridge, and said edge portion of said skin is in contact with and bent by said at least one rib;

providing a plurality of gates for injecting molten resin into the cavity, said plurality of gates comprising a first gate facing said site at which said skin is positioned and a second gate facing a portion of said mold not occupied by said skin;

injecting a molten resin into the cavity through the plurality of gates until the cavity is filled with said molten resin, thereby forming the substrate, thermally-fusing the heat fusible layer of said skin to the substrate and forming the resin part, wherein said step of injecting is carried out so that a first portion of said molten resin injected through said first gate substantially reaches said second gate before a second portion of said molten resin is injected from said second gate to form said substrate; and taking the resin part out of the mold.

2. The method of molding a resin part according to claim 1, wherein said resin part comprises an exposed area in which said substrate is not covered with said skin, and said skin comprises an additional edge portion adjacent the exposed area.

3. The method of molding a resin part according to claim 1, wherein said recess has a first side wall opposite a portion of said site, and a second side wall opposite a portion of said mold other than said site, and wherein said step of extending comprises extending said at least one rib from the first side wall to the second side wall.

4. A method of molding a resin part having a substrate and a plurality of skin members thermally fused to a surface of said substrate, each of said plurality of skin members comprising a multi-layer construction including a heat fusible layer, a cushion layer formed on said heat fusible layer, and a solid skin layer formed on said cushion layer, and having an edge portion, said method comprising the steps of:

providing a mold having an inner surface and defining a cavity therein;

setting each of said plurality of skin members at sites within the cavity so that each of said plurality of skin members is in contact with the inner surface, wherein said mold comprises:
  (a) a first mold half having
    (i) a first molding surface for forming part of said substrate; and
    (ii) a ridge, disposed at said sites for forming a part of a groove structure in said substrate adjacent said edge portion; and
  (b) a second mold half, having a second molding surface for forming a remaining part of said substrate, having a recess, disposed substantially opposite said ridge of said first mold half, for forming a different part of the groove structure of said substrate;

providing a plurality of gates for injecting molten resin into the cavity, said plurality of gates comprising a first gate facing said site at which said skin is positioned and a second gate facing a portion of said mold not occupied by said skin;

forming each of said plurality of skin members so that the edge portion of each of said plurality of skin members conforms about said ridge and coupling conformed edge portions together to form coupled skin members;

injecting a molten resin into the cavity through the plurality of gates until the cavity is filled with said molten resin, thereby forming the substrate, thermally-fusing the heat fusible layer of said plurality of skin members to the substrate and forming the resin part, wherein said step of injecting is carried out so that a first portion of said molten resin injected through said first gate substantially reaches said second gate before a second portion of said molten resin is injected from said second gate to form said substrate; and taking the resin part out of the mold.

5. A method of molding a resin part having a substrate and a plurality of skin members thermally fused to a surface of said substrate, each of said plurality of skin members comprising a multi-layer construction including a heat fusible layer, a cushion layer formed on said heat fusible layer, and a solid skin layer formed on said cushion layer, and having an edge portion, said method comprising the steps of:

providing a mold having an inner surface and defining a cavity therein;

providing a plurality of gates for injecting molten resin into the cavity, said plurality of gates comprising a first gate facing said site at which said skin is positioned and a second gate facing a portion of said mold not occupied by said skin;

positioning each of said plurality of skin members at sites within the cavity so that each of said plurality of skin members is in contact with the inner surface;

coupling a first end portion of a first one of said plurality of skin members to a second end portion of a second one of said plurality of skin members to form a seam wherein the seam comprises a vertical seam located between facing surfaces of bent areas of each of the first and second end portions and wherein the edge portion of said first one of said plurality of skin members is folded up and around the edge portion of said second one of said plurality of skin members, injecting a molten resin into the cavity through the plurality of gates until the cavity is filled with said molten resin, thereby forming the substrate, thermally-fusing the heat fusible layer of said plurality of skin members to the substrate and forming the resin part, wherein said step of injecting is carried out so that a first portion of said molten resin injected through said first gate substantially reaches said second gate before a second portion of said molten resin is injected from said second gate to form said substrate; and taking the resin part out of the mold.

6. The method of molding a resin part according to claim 4, further comprising the step of:

positioning said coupled skin members in said cavity with each said edge portion positioned along said ridge of said first mold half.

* * * * *